United States Patent
Zhang et al.

(10) Patent No.: US 11,616,665 B2
(45) Date of Patent: Mar. 28, 2023

(54) COMMUNICATION METHOD AND COMMUNICATIONS APPARATUS

(71) Applicant: Huawei Technologies Co., Ltd., Shenzhen (CN)

(72) Inventors: Xi Zhang, Ottawa (CA); Minghui Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/490,907

(22) Filed: Sep. 30, 2021

(65) Prior Publication Data

US 2022/0116246 A1 Apr. 14, 2022

Related U.S. Application Data

(63) Continuation of application No. 16/674,261, filed on Nov. 5, 2019, now Pat. No. 11,201,764, which is a (Continued)

(30) Foreign Application Priority Data

May 5, 2017 (CN) .......................... 201710313932.5
Jul. 26, 2017 (CN) .......................... 201710620155.9

(51) Int. Cl.
*H04L 25/02* (2006.01)
*H04L 5/00* (2006.01)
(Continued)

(52) U.S. Cl.
CPC ........ *H04L 25/0224* (2013.01); *H04L 1/0003* (2013.01); *H04L 5/001* (2013.01);
(Continued)

(58) Field of Classification Search
None
See application file for complete search history.

(56) References Cited

U.S. PATENT DOCUMENTS 10,727,998 B2 7/2020 Zhang et al.
2014/0293881 A1 10/2014 Khoshnevis et al.
(Continued)

FOREIGN PATENT DOCUMENTS

CN 104980247 A 10/2015
CN 105144817 A 12/2015
(Continued)

OTHER PUBLICATIONS

"Phase-Tracking Reference Signal Design for High-Frequency Systems," 3GPP TSG RAN WG1 Meeting #88, Athens, Greece, R1-1703406, XP051221949, pp. 1-11, 3rd Generation Partnership Project, Valbonne, France (Feb. 13-17, 2017).
(Continued)

*Primary Examiner* — Kenny S Lin
(74) *Attorney, Agent, or Firm* — Leydig, Voit & Mayer, Ltd.

(57) ABSTRACT

This application discloses a communication method and a communications apparatus. The method includes: determining, by a first device, a phase tracking reference signal PTRS pattern, where the PTRS pattern includes one or more PTRS chunks, and each PTRS chunk includes one or more PTRS samples; and mapping, by the first device, a PTRS to one or more symbols, and sending the one or more symbols to a second device.

28 Claims, 10 Drawing Sheets

A first device determines a phase tracking reference signal PTRS pattern based on at least one of a modulation and coding scheme and a scheduled bandwidth, where the PTRS pattern includes one or more PTRS chunks, and each PTRS chunk includes one or more PTRS samples — 201

The first device maps a PTRS to one or more symbols, and sends the one or more symbols to a second device — 202

Related U.S. Application Data continuation of application No. PCT/CN2018/085601, filed on May 4, 2018.

(51) Int. Cl.
  *H04L 1/00* (2006.01)
  *H04W 72/0446* (2023.01)

(52) U.S. Cl.
  CPC ........ *H04L 5/0048* (2013.01); *H04L 25/0222* (2013.01); *H04W 72/0446* (2013.01)

(56) References Cited

U.S. PATENT DOCUMENTS

| | | |
|---|---|---|
| 2015/0288483 A1 | 10/2015 | Sun et al. |
| 2018/0091350 A1 | 3/2018 | Akkarakaran et al. |
| 2018/0323933 A1 | 11/2018 | Nam et al. |
| 2019/0081844 A1 | 3/2019 | Lee et al. |
| 2020/0052930 A1 | 2/2020 | Kim et al. |
| 2020/0067628 A1 | 2/2020 | Xu et al. |
| 2020/0196332 A1* | 6/2020 | Yokomakura ......... H04L 27/261 |
| 2020/0235979 A1 | 7/2020 | Yokomakura et al. |

FOREIGN PATENT DOCUMENTS

| | | | | |
|---|---|---|---|---|
| CN | 108809598 A | * | 11/2018 | ........... H04L 1/0003 |
| WO | 2018064313 A1 | | 4/2018 | |
| WO | WO-2019048050 A1 | * | 3/2019 | |

OTHER PUBLICATIONS

"Further details for PT-RS design," 3GPP TSG RAN WG1 Meeting #88b, Spokane, USA, R1-1704240, pp. 1-5, 3rd Generation Partnership Project, Valbonne, France (Apr. 3-7, 2017).

"PTRS for DFT-s-OFDM," 3GPP TSG RAN WG1 Ad Hoc Meeting, Qingdao, China, R1-1709940, pp. 1-6, 3rd Generation Partnership Project, Valbonne, France (Jun. 27-30, 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, pp. 1-196, 3rd Generation Partnership Project, Valbonne, France (Mar. 2017).

"3rd Generation Partnership Project; Technical Specification Group Radio Access Network; NR; Radio Resource Control (RRC); Protocol specification (Release 15)," 3GPP TS 38.331 V0.0.2, pp. 1-13, 3rd Generation Partnership Project, Valbonne, France (Mar. 2017).

"On RS for Phase Tracking," 3GPP TSG-RAN WG1 #88, Athens, Greece, R1-1702213, XP05120937, pp. 1-4, 3rd Generation Partnership Project, Valbonne, France (Feb. 13-17, 2017).

"PTRS for DFT-s-OFDM," 3GPP TSG RAN WG1 Meeting #89, Hangzhou, China, R1-1708142, pp. 1-4, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.2.0, pp. 1-197, 3rd Generation Partnership Project, Valbonne, France (Mar. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.2.0 , pp. 1-454, 3rd Generation Partnership Project, Valbonne, France (Mar. 2017).

Ericsson, "On UL PTRS Design," 3GPP TSG RAN WG1 #88bis, R1-1705907, total 4 pages, 3rd Generation Partnership Project, Valbonne, France (Apr. 3-7, 2017).

Ericsson, "On DL PTRS Design," 3GPP TSG RAN WG1 #88bis, R1-1705906, total 11 pages, 3rd Generation Partnership Project, Valbonne, France (Apr. 3-7, 2017).

CMCC, "Phase-Tracking Reference Signal Design for High-Frequency Systems," 3GPP TSG RAN WG1 NR Ad-Hoc Meeting, Spokane, USA, R1-1700438, total 11 pages, 3rd Generation Partnership Project, Valbonne, France (Jan. 16-20, 2017).

Huawei, HiSilicon, "Further details for PT-RS design," 3GPP TSG RAN WG1 Meeting Ad Hoc for NR, Spokane, USA, R1-1700073, total 5 pages, 3rd Generation Partnership Project, Valbonne, France (Jan. 16-20, 2017).

U.S. Appl. No. 16/674,261, filed Nov. 5, 2019.

* cited by examiner

COMMUNICATION METHOD AND COMMUNICATIONS APPARATUS

CROSS-REFERENCE TO RELATED APPLICATIONS

This application is a continuation of U.S. patent application Ser. No. 16/674,261, filed on Nov. 5, 2019, which is a continuation of International Application No. PCT/CN2018/085601, filed on May 4, 2018, which claims priority of Chinese Patent Application No. 201710620155.9, filed on Jul. 26, 2017 and Chinese Patent Application No. 201710313932.5, filed on May 5, 2017. All of the aforementioned patent applications are hereby incorporated by reference in their entireties.

TECHNICAL FIELD

This application relates to the field of communications technologies, and in particular, to a communication method and a communications apparatus.

BACKGROUND

In a next generation wireless communications network (for example, 5G), an operating frequency band of a communications system is above 6 GHz, for example, 28 GHz, 39 GHz, 60 GHz, or 73 GHz. Therefore, the next generation wireless communications network has distinctive features of a high-frequency communications system, thereby easily achieving a relatively high throughput. However, compared with an existing wireless communications network, in the next generation wireless communications network operating in a range above 6 GHz, a phase noise level deteriorates at a level of 20 log(f1/f2) as the operating frequency band increases, where f1 and f2 are both frequencies of carriers. A 2 GHz frequency band and a 28 GHz frequency band are used as an example. A phase noise level of the 28 GHz frequency band is 23 dB higher than that of the 2 GHz frequency band. A higher phase noise level indicates a larger phase error caused by a common phase error (CPE) to a transmitted signal.

In the prior art, a demodulation reference signal (DMRS) and a phase compensation reference signal (PCRS) are used in both uplink and downlink to jointly complete channel estimation, phase noise estimation, and data demodulation, and then phase noise error compensation is performed based on estimated phase noise, to improve communication quality. The PCRS may also be referred to as a phase tracking reference signal (PTRS), and is referred to as a PTRS for ease of description below.

Currently, a PTRS is sent continuously in time domain and through frequency division on a plurality of corresponding ports in frequency domain. The ports are fixed. In a case of a high data bandwidth, a relatively large quantity of subcarriers are occupied, resulting in relatively high resource overheads.

How to flexibly configure a PTRS to reduce a quantity of subcarriers occupied by the PTRS, reduce overheads for sending the PTRS, and improve spectral efficiency is a problem to be resolved urgently.

SUMMARY

This application provides a communication method and a communications apparatus, so that phase tracking reference signal patterns are flexibly configured for different terminals based on different modulation and coding schemes and/or different scheduled bandwidths, thereby reducing phase tracking reference signal overheads and improving spectral efficiency while ensuring phase noise error compensation performance.

An embodiment of this application provides a communication method. The method includes:

determining, by a first device, a phase tracking reference signal (PTRS) pattern based on at least one of a modulation and coding scheme (MCS) and a scheduled bandwidth, where the PTRS pattern includes one or more PTRS chunks, and each PTRS chunk includes one or more PTRS samples; and mapping, by the first device, a PTRS to one or more symbols, and sending the one or more symbols to a second device.

According to the method provided in this embodiment of this application, the first device determines the phase tracking reference signal pattern based on the at least one of a threshold of the modulation and coding scheme and the scheduled bandwidth, so that phase tracking reference signal patterns are flexibly determined based on different modulation and coding schemes and/or different scheduled bandwidths, thereby reducing phase tracking reference signal overheads and improving spectral efficiency while ensuring phase noise error compensation performance.

Optionally, the determining, by a first device, a phase tracking reference signal (PTRS) pattern based on at least one of a modulation and coding scheme (MCS) and a scheduled bandwidth includes:

determining, by the first device from a first association rule, a PTRS chunk density and a quantity of PTRS samples included in a PTRS chunk that are associated with the at least one of the MCS and the scheduled bandwidth, and determining the PTRS chunk density and the quantity of PTRS samples included in a PTRS chunk that are associated with the at least one of the MCS and the scheduled bandwidth, as a PTRS chunk density and a quantity of PTRS samples included in a PTRS chunk that are of the PTRS pattern, where the first association rule is an association relationship between the at least one of the MCS and the scheduled bandwidth and the PTRS chunk density and the quantity of PTRS samples included in a PTRS chunk.

Optionally, the mapping, by the first device, a PTRS to one or more symbols, and sending the one or more symbols to a second device includes:

mapping, by the first device, the PTRS to the one or more symbols for which single-carrier modulation is used, and sending the one or more symbols to the second device.

Optionally, the single carrier is a discrete Fourier transform spread orthogonal frequency division multiplexing (DFTS-OFDM) waveform.

Optionally, when the scheduled bandwidth is in a first scheduled bandwidth interval, and the modulation and coding scheme is in a first modulation and coding scheme interval, the PTRS pattern is not sent.

Optionally, the first device is a terminal.

Optionally, before the determining, by a first device, a phase tracking reference signal (PTRS) pattern based on at least one of a modulation and coding scheme (MCS) and a scheduled bandwidth, the method further includes:

determining, by the first device, a threshold of the MCS and/or a threshold of the scheduled bandwidth based on at least one of a phase noise level, a subcarrier spacing, and a frequency.

Optionally, before the determining, by a first device, a phase tracking reference signal (PTRS) pattern based on at least one of a modulation and coding scheme (MCS) and a scheduled bandwidth, the method further includes:

feeding back, by the first device, the at least one of the phase noise level, the subcarrier spacing, and the frequency to the second device.

An embodiment of this application provides a communications apparatus. The apparatus includes a memory and a processor. The memory is configured to store program code including a computer operation instruction, and the processor runs the computer operation instruction to perform any one of the foregoing communication methods.

An embodiment of this application provides a communications apparatus, and the communications apparatus can implement any communication method provided in the foregoing first aspect.

In an embodiment, the communications apparatus includes a plurality of functional modules, for example, a processing unit and a transceiver unit, configured to implement any communication method provided in the foregoing first aspect, so as to determine a phase tracking reference signal pattern based on at least one of a threshold of a modulation and coding scheme and a scheduled bandwidth. In this way, phase tracking reference signal patterns are flexibly determined based on different modulation and coding schemes and/or different scheduled bandwidths, thereby reducing phase tracking reference signal overheads and improving spectral efficiency while ensuring phase noise error compensation performance.

In an embodiment, a structure of the communications apparatus includes a processor and a transceiver. The processor is configured to support the communications apparatus in performing corresponding functions in the foregoing communication methods. The transceiver is configured to: support communication between the communications apparatus and a terminal, and send, to the terminal, information or an instruction used in the foregoing communication methods. The communications apparatus may further include a memory. The memory is configured to be coupled to the processor, and the memory stores a program instruction and data that are necessary for the communications apparatus.

An embodiment of this application provides a communication method, including:

determining, by a network device based on an association rule, an association relationship between P PTRS ports and Q DMRS ports in a DMRS port group associated with the P PTRS ports, where P is greater than or equal to 1 and less than or equal to Q, and Q is a quantity of DMRS ports included in the DMRS port group associated with the P PTRS ports; and sending, by the network device, the association relationship between the P PTRS ports and the Q DMRS ports in the DMRS port group to a terminal.

Optionally, the association rule is any one or more of the following:

if one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . . ;

if one DMRS port group is associated with one PTRS port, the PTRS port is mapped to a DMRS port with a smallest or largest port number in the DMRS port group; or if one DMRS port group is associated with one PTRS port, the PTRS port is mapped to a DMRS port with a largest signal-to-noise ratio in the DMRS port group.

Optionally, the association relationship between the PTRS ports and the Q DMRS ports in the DMRS port group means that a DMRS port in the DMRS port group and the PTRS port have a same precoding matrix.

Optionally, before the determining, by a network device based on an association rule, an association relationship between P PTRS ports and Q DMRS ports in a DMRS port group associated with the P PTRS ports, the method further includes:

obtaining, by the network device, PTRS port configuration reference information, where the PTRS port configuration reference information includes at least one of the following: shared local oscillator information of the terminal, or a common phase error measured on each PTRS port when the terminal is in full configuration of PTRS ports; a quantity of DMRS port groups; a quantity of layers to be scheduled to the terminal; and a maximum quantity of PTRS ports; and determining, by the network device based on the PTRS port configuration reference information, a quantity of PTRS ports used by the terminal to send a PTRS.

Optionally, the determining, by the network device based on the PTRS port configuration reference information, a quantity of PTRS ports used by the terminal to send a PTRS includes:

if the network device determines, based on the shared local oscillator information of the terminal, that a plurality of intermediate radio frequency links of the terminal do not share one crystal oscillator unit, and determines that the quantity of layers to be scheduled to the terminal is less than or equal to the maximum quantity of PTRS ports, determining the quantity of layers to be scheduled to the terminal, as the quantity of PTRS ports;

if the network device determines, based on the shared local oscillator information of the terminal, that a plurality of intermediate radio frequency links of the terminal do not share one crystal oscillator unit, and determines that the quantity of layers to be scheduled to the terminal is greater than the maximum quantity of PTRS ports, determining the maximum quantity of PTRS ports as the quantity of PTRS ports; or if the network device determines, based on the shared local oscillator information of the terminal, that a plurality of intermediate radio frequency links of the terminal share one crystal oscillator unit, determining that the quantity of PTRS ports is greater than or equal to 1 and less than or equal to the quantity of DMRS port groups.

An embodiment of this application provides a communications apparatus, including:

a processor, configured to determine, based on an association rule, an association relationship between P PTRS ports and Q DMRS ports in a DMRS port group associated with the P PTRS ports, where P is greater than or equal to 1 and less than or equal to Q, and Q is a quantity of DMRS ports included in the DMRS port group associated with the P PTRS ports; and a transceiver, configured to send the association relationship between the P PTRS ports and the Q DMRS ports in the DMRS port group to a terminal.

Optionally, the association rule is any one or more of the following:

if one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . . ;

if one DMRS port group is associated with one PTRS port, the PTRS port is mapped to a DMRS port with a smallest or largest port number in the DMRS port group; or if one DMRS port group is associated with one PTRS port, the PTRS port is mapped to a DMRS port with a largest signal-to-noise ratio in the DMRS port group.

Optionally, the association relationship between the PTRS ports and the Q DMRS ports in the DMRS port group means that a DMRS port in the DMRS port group and the PTRS port have a same precoding matrix.

Optionally, the transceiver is further configured to:

obtain PTRS port configuration reference information, where the PTRS port configuration reference information includes at least one of the following: shared local oscillator information of the terminal, or a common phase error measured on each PTRS port when the terminal is in full configuration of PTRS ports; a quantity of DMRS port groups; a quantity of layers to be scheduled to the terminal; and a maximum quantity of PTRS ports.

The processor is further configured to determine, based on the PTRS port configuration reference information, a quantity of PTRS ports used by the terminal to send a PTRS.

Optionally, the processor is further configured to:

if it is determined, based on the shared local oscillator information of the terminal, that a plurality of intermediate radio frequency links of the terminal do not share one crystal oscillator unit, and it is determined that the quantity of layers to be scheduled to the terminal is less than or equal to the maximum quantity of PTRS ports, determine the quantity of layers to be scheduled to the terminal, as the quantity of PTRS ports;

if it is determined, based on the shared local oscillator information of the terminal, that a plurality of intermediate radio frequency links of the terminal do not share one crystal oscillator unit, and it is determined that the quantity of layers to be scheduled to the terminal is greater than the maximum quantity of PTRS ports, determine the maximum quantity of PTRS ports as the quantity of PTRS ports; or if it is determined, based on the shared local oscillator information of the terminal, that a plurality of intermediate radio frequency links of the terminal share one crystal oscillator unit, determine that the quantity of PTRS ports is greater than or equal to 1 and less than or equal to the quantity of DMRS port groups.

An embodiment of this application provides a communications apparatus, including:

a processing unit, configured to determine, based on an association rule, an association relationship between P PTRS ports and Q DMRS ports in a DMRS port group associated with the P PTRS ports, where P is greater than or equal to 1 and less than or equal to Q, and Q is a quantity of DMRS ports included in the DMRS port group associated with the P PTRS ports; and a transceiver unit, configured to send the association relationship between the P PTRS ports and the Q DMRS ports in the DMRS port group to a terminal.

Optionally, the association rule is any one or more of the following:

if one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . . ;

if one DMRS port group is associated with one PTRS port, the PTRS port is mapped to a DMRS port with a smallest or largest port number in the DMRS port group; or if one DMRS port group is associated with one PTRS port, the PTRS port is mapped to a DMRS port with a largest signal-to-noise ratio in the DMRS port group.

Optionally, the association relationship between the PTRS ports and the Q DMRS ports in the DMRS port group means that a DMRS port in the DMRS port group and the PTRS port have a same precoding matrix.

Optionally, the transceiver unit is further configured to:

obtain PTRS port configuration reference information, where the PTRS port configuration reference information includes at least one of the following: shared local oscillator information of the terminal, or a common phase error measured on each PTRS port when the terminal is in full configuration of PTRS ports; a quantity of DMRS port groups; a quantity of layers to be scheduled to the terminal; and a maximum quantity of PTRS ports.

The processing unit is further configured to determine, based on the PTRS port configuration reference information, a quantity of PTRS ports used by the terminal to send a PTRS.

Optionally, the processing unit is further configured to:

if it is determined, based on the shared local oscillator information of the terminal, that a plurality of intermediate radio frequency links of the terminal do not share one crystal oscillator unit, and it is determined that the quantity of layers to be scheduled to the terminal is less than or equal to the maximum quantity of PTRS ports, determine the quantity of layers to be scheduled to the terminal, as the quantity of PTRS ports;

if it is determined, based on the shared local oscillator information of the terminal, that a plurality of intermediate radio frequency links of the terminal do not share one crystal oscillator unit, and it is determined that the quantity of layers to be scheduled to the terminal is greater than the maximum quantity of PTRS ports, determine the maximum quantity of PTRS ports as the quantity of PTRS ports; or if it is determined, based on the shared local oscillator information of the terminal, that a plurality of intermediate radio frequency links of the terminal share one crystal oscillator unit, determine that the quantity of PTRS ports is greater than or equal to 1 and less than or equal to the quantity of DMRS port groups.

An embodiment of this application provides a communication method, including:

determining, by a first device, a phase tracking reference signal (PTRS) pattern, where the PTRS pattern includes one or more PTRS chunks, and each PTRS chunk includes one or more PTRS samples; and mapping, by the first device, a PTRS to one or more symbols, and sending the one or more symbols to a second device.

In an embodiment, the determining, by a first device, a phase tracking reference signal (PTRS) pattern further includes: determining, by the first device, the phase tracking reference signal (PTRS) pattern based on at least one of a modulation and coding scheme (MCS) and a scheduled bandwidth.

In another embodiment, the determining, by a first device, a phase tracking reference signal (PTRS) pattern further includes: determining, by the first device, the phase tracking reference signal (PTRS) pattern based on at least one of the following parameters: an inter-symbol PTRS time domain density, an intra-symbol PTRS chunk density, and a quantity of PTRS samples.

In another embodiment, the determining, by a first device, a phase tracking reference signal (PTRS) pattern further includes: determining, by the first device, the phase tracking reference signal (PTRS) pattern based on at least one of the following parameters: an inter-symbol PTRS time domain density, an intra-symbol PTRS chunk density, a quantity of PTRS samples, and a distribution location of a PTRS chunk within a symbol.

In another embodiment, the method further includes: receiving, from the second device, the information used to indicate the intra-symbol PTRS chunk density and the quantity of PTRS samples.

In another embodiment, the method further includes: receiving, from the second device, indication information of the intra-symbol PTRS chunk density, indication information of the quantity of PTRS samples, and indication information of the distribution location of a chunk within a symbol.

In another embodiment, X bits are used to jointly identify the intra-symbol PTRS chunk density, the quantity of PTRS samples, and the distribution location of a chunk within a symbol, where X is an integer greater than 2.

In another embodiment, the method further includes: determining the inter-symbol PTRS time domain density based on information about a mapping relationship between a modulation and coding scheme (MCS) and the inter-symbol PTRS time domain density.

In another embodiment, the mapping, by the first device, a PTRS to one or more symbols, and sending the one or more symbols to a second device includes: mapping, by the first device, the PTRS to the one or more symbols for which single-carrier modulation is used, and sending the one or more symbols to the second device.

In another embodiment, the one or more symbols for which single-carrier modulation is used are discrete Fourier transform spread orthogonal frequency division multiplexing (DFTS-OFDM) symbols.

An embodiment of this application further provides a communications apparatus, including a processing unit and a transceiver unit, where the processing unit is configured to determine a phase tracking reference signal (PTRS) pattern, where the PTRS pattern includes one or more PTRS chunks, and each PTRS chunk includes one or more PTRS samples; and the transceiver unit is configured to map a PTRS to one or more symbols, and send the one or more symbols to a network device.

In an embodiment, the processing unit is further configured to determine the phase tracking reference signal (PTRS) pattern based on at least one of a modulation and coding scheme (MCS) and a scheduled bandwidth.

In another embodiment, the processing unit is further configured to determine the phase tracking reference signal (PTRS) pattern based on at least one of the following parameters: an inter-symbol PTRS time domain density, an intra-symbol PTRS chunk density, and a quantity of PTRS samples.

In another embodiment, the processing unit is further configured to determine the phase tracking reference signal (PTRS) pattern based on at least one of the following parameters: an inter-symbol PTRS time domain density, an intra-symbol PTRS chunk density, a quantity of PTRS samples, and a distribution location of a PTRS chunk within a symbol.

In another embodiment, the transceiver unit is further configured to receive, from a second device, indication information of the intra-symbol PTRS chunk density and indication information of the quantity of PTRS samples.

In another embodiment, the transceiver unit is further configured to receive, from a second device, indication information of the intra-symbol PTRS chunk density, indication information of the quantity of PTRS samples, and indication information of the distribution location of a PTRS chunk within a symbol.

In another embodiment, the transceiver unit is further configured to receive X bits from the second device. The X bits are used to identify the intra-symbol PTRS chunk density, the quantity of PTRS samples, and the distribution location of a PTRS chunk within a symbol, where X is an integer greater than 2.

In another embodiment, the processing unit is further configured to determine the inter-symbol PTRS time domain density based on information about a mapping relationship between a modulation and coding scheme (MCS) and the inter-symbol PTRS time domain density.

In another embodiment, the symbol is a discrete Fourier transform spread orthogonal frequency division multiplexing (DFTS-OFDM) symbol.

In another embodiment, the communications apparatus is a terminal device.

An embodiment of this application further provides a communication method, including: receiving one or more symbols, where a phase tracking reference signal (PTRS) is mapped to the one or more symbols, a PTRS pattern includes one or more PTRS chunks, and each PTRS chunk includes one or more PTRS samples; and
determining the phase tracking reference signal (PTRS) pattern from the one or more symbols.

In an embodiment, the determining the phase tracking reference signal (PTRS) pattern from the one or more symbols further includes: determining the phase tracking reference signal (PTRS) pattern based on at least one of a modulation and coding scheme (MCS) and a scheduled bandwidth.

In another embodiment, the determining the phase tracking reference signal (PTRS) pattern from the one or more symbols further includes: determining the phase tracking reference signal (PTRS) pattern based on at least one of the following parameters: an inter-symbol PTRS time domain density, an intra-symbol PTRS chunk density, and a quantity of PTRS samples.

In another embodiment, the determining the phase tracking reference signal (PTRS) pattern from the one or more symbols further includes: determining the phase tracking reference signal (PTRS) pattern based on at least one of the following parameters: an inter-symbol PTRS time domain density, an intra-symbol PTRS chunk density, a quantity of PTRS samples, and a distribution location of a PTRS chunk within a symbol.

In another embodiment, the method further includes: sending indication information of the intra-symbol PTRS chunk density and indication information of the quantity of PTRS samples.

In another embodiment, the method further includes: sending indication information of the intra-symbol PTRS chunk density, indication information of the quantity of PTRS samples, and indication information of the distribution location of a PTRS chunk within a symbol.

In another embodiment, the one or more symbols are discrete Fourier transform spread orthogonal frequency division multiplexing (DFTS-OFDM) symbols.

An embodiment of this application further provides a communications apparatus, including: a transceiver unit, configured to receive one or more symbols, where a phase tracking reference signal (PTRS) is mapped to the one or more symbols, a PTRS pattern includes one or more PTRS chunks, and each PTRS chunk includes one or more PTRS samples; and a processing unit, configured to determine the phase tracking reference signal (PTRS) pattern from the one or more symbols.

In an embodiment, the processing unit is configured to determine the phase tracking reference signal (PTRS) pattern based on at least one of a modulation and coding scheme (MCS) and a scheduled bandwidth.

In another embodiment, the processing unit is configured to determine the phase tracking reference signal (PTRS) pattern based on at least one of the following parameters: an inter-symbol PTRS time domain density, an intra-symbol PTRS chunk density, and a quantity of PTRS samples.

In another embodiment, the processing unit is configured to determine the phase tracking reference signal (PTRS) pattern based on at least one of the following parameters: an inter-symbol PTRS time domain density, an intra-symbol PTRS chunk density, a quantity of PTRS samples, and a distribution location of a PTRS chunk within a symbol.

In another embodiment, the transceiver unit is further configured to send indication information of the intra-symbol PTRS chunk density and indication information of the quantity of PTRS samples.

In another embodiment, the transceiver unit is further configured to send indication information of the intra-symbol PTRS chunk density, indication information of the quantity of PTRS samples, and indication information of the distribution location of a PTRS chunk within a symbol.

In another embodiment, the one or more symbols are discrete Fourier transform spread orthogonal frequency division multiplexing (DFTS-OFDM) symbols.

This application further provides a computer-readable storage medium, configured to store a computer software instruction used to perform any function in any one of the foregoing communication methods. The computer software instruction includes a program configured to perform any one of the foregoing communication methods.

An embodiment of this application further provides a computer program product that includes an instruction. When the computer program product runs on a computer, the computer is enabled to perform the communication method according to the foregoing aspects.

DESCRIPTION OF EMBODIMENTS

Figure 1:
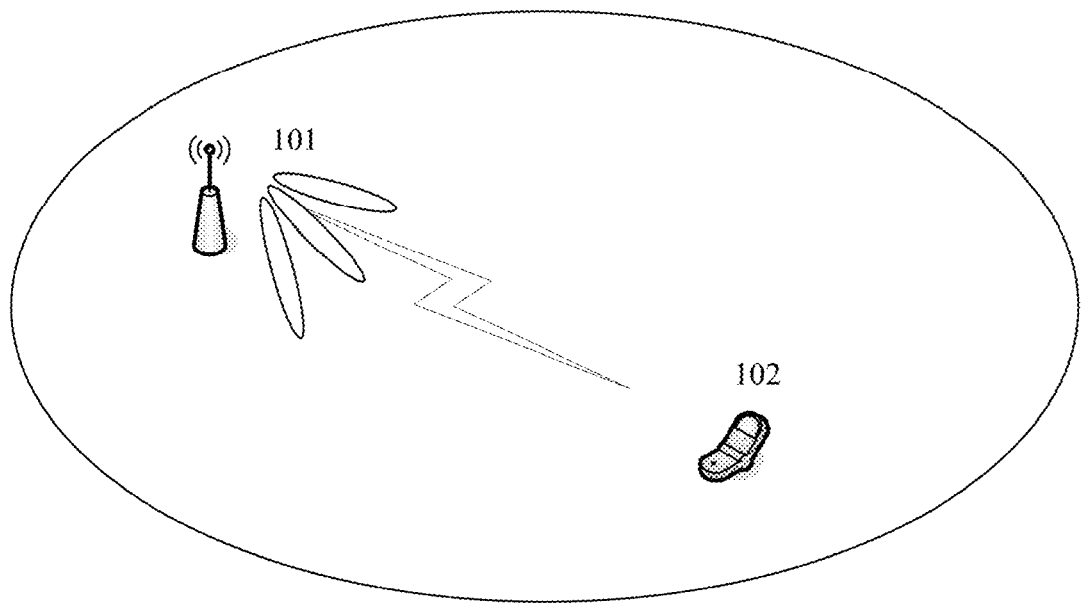
FIG. 1 is a schematic architectural diagram of an application scenario according to an embodiment of this application.

The following further describes in detail exemplary embodiments of this application with reference to accompanying drawings.

Embodiments of this application may be applied to various mobile communications systems, such as a global system for mobile communications (GSM) system, a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), an evolved long term evolution (eLTE) system, a 5G system (for example, a new radio (NR) system), and other mobile communications systems.

In the following, some terms in this application are described, to facilitate understanding by a person skilled in the art.

(1) A terminal, also referred to as user equipment (UE), is a device providing voice and/or data connectivity for a user, for example, a handheld device or a vehicle-mounted device with a wireless connection function. A common terminal includes, for example, a mobile phone, a tablet computer, a notebook computer, a palmtop computer, a mobile Internet device (MID), or a wearable device such as a smartwatch, a smart band, or a pedometer.

(2) A network device may be a base transceiver station (BTS) in a GSM system or a CDMA system, may be a NodeB (NB) in a WCDMA system, or may be an evolved NodeB (eNB or eNodeB) in an LTE system, or a radio controller in a cloud radio access network (CRAN). The network device may alternatively be a network device in a future 5G network, for example, a gNB in an NR system, a small cell, a micro base station, or a TRP (transmission reception point), or may be a relay station, an access point, a network device in a future evolved public land mobile network (PLMN), or any other radio access device. However, embodiments of this application are not limited thereto.

(3) A physical resource block (PRB) is a time-frequency resource unit, occupying one subframe or one slot in time domain, and occupying a plurality of consecutive subcarriers in frequency domain. In LTE, a PRB occupies 14 consecutive orthogonal frequency division multiplexing (OFDM) symbols in one subframe in time domain, and occupies 12 consecutive subcarriers in frequency domain.

(4) A subcarrier width is a minimum granularity in frequency domain. For example, in LTE, a subcarrier width of one subcarrier is 15 KHz.

(5) "A plurality of" means two or more than two. "And/Or" describes an association relationship between associated objects, and represents that three relationships may exist. For example, A and/or B may represent the following three cases: only A exists, both A and B exist, and only B exists. The character "/" generally represents an "or" relationship between associated objects. In addition, it should be understood that although terms "first", "second", "third", and the like may be used to describe various messages, requests, and terminals in embodiments of this application, these messages, requests, and terminals shall not be limited to these terms. These terms are used only to distinguish between the messages, requests, and terminals.

FIG. 1 is a schematic architectural diagram of an application scenario according to an embodiment of this application. A networking architecture shown in FIG. 1 includes a base station 101 and a terminal 102. The base station 101 may communicate with the terminal 102 by using a low frequency (e.g., below 6 GHz) or a millimeter-wave band of a higher frequency (e.g., above 6 GHz). For example, the millimeter-wave band may be 28 GHz or 38 GHz, or a data-plane enhanced band with a relatively small coverage area, for example, a frequency band above 70 GHz. The terminal 102 in coverage of the base station 101 may communicate with the base station 101 by using a low frequency or a millimeter-wave band of a higher frequency. FIG. 1 is a simplified schematic diagram used merely as an example. A network may further include another device, which is not shown in FIG. 1.

A communication method and a communications device that are provided in embodiments of this application may be applied to a terminal. The terminal includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing by using a process, such as a Linux operating system, a Unix operating system, an Android operating system, an iOS operating system, or a Windows operating system. The application layer includes applications such as a browser, a contact list, text processing software, and instant communication software.

In addition, aspects or features of this application may be implemented as a method, an apparatus, or an artifact that uses standard programming and/or engineering technologies. The term "artifact" used in this application covers a computer program that can be accessed from any computer-readable device, carrier, or medium. For example, the computer-readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices configured to store information, and/or other machine-readable media. The term "machine-readable media" may include but is not limited to various media that can store, contain, and/or carry instructions and/or data.

Figure 2:
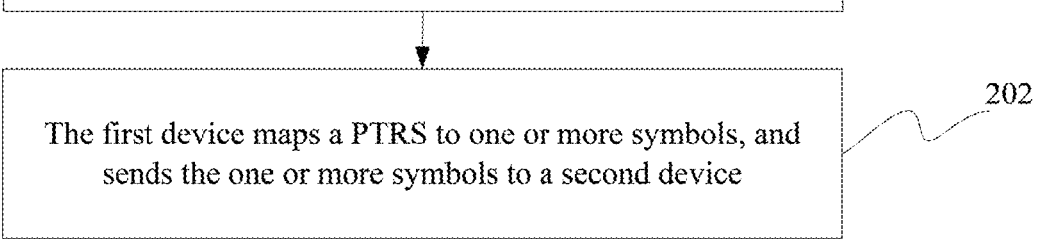
FIG. 2 is a schematic flowchart of a communication method according to an embodiment of this application.

With reference to the foregoing descriptions, FIG. 2 is a schematic flowchart of a communication method according to an embodiment of this application. The method includes the following steps.

Step 201: A first device determines a phase tracking reference signal (PTRS) pattern based on at least one of a modulation and coding scheme and a scheduled bandwidth, where the PTRS pattern includes one or more PTRS chunks, and each PTRS chunk includes one or more PTRS samples.

Figure 3:
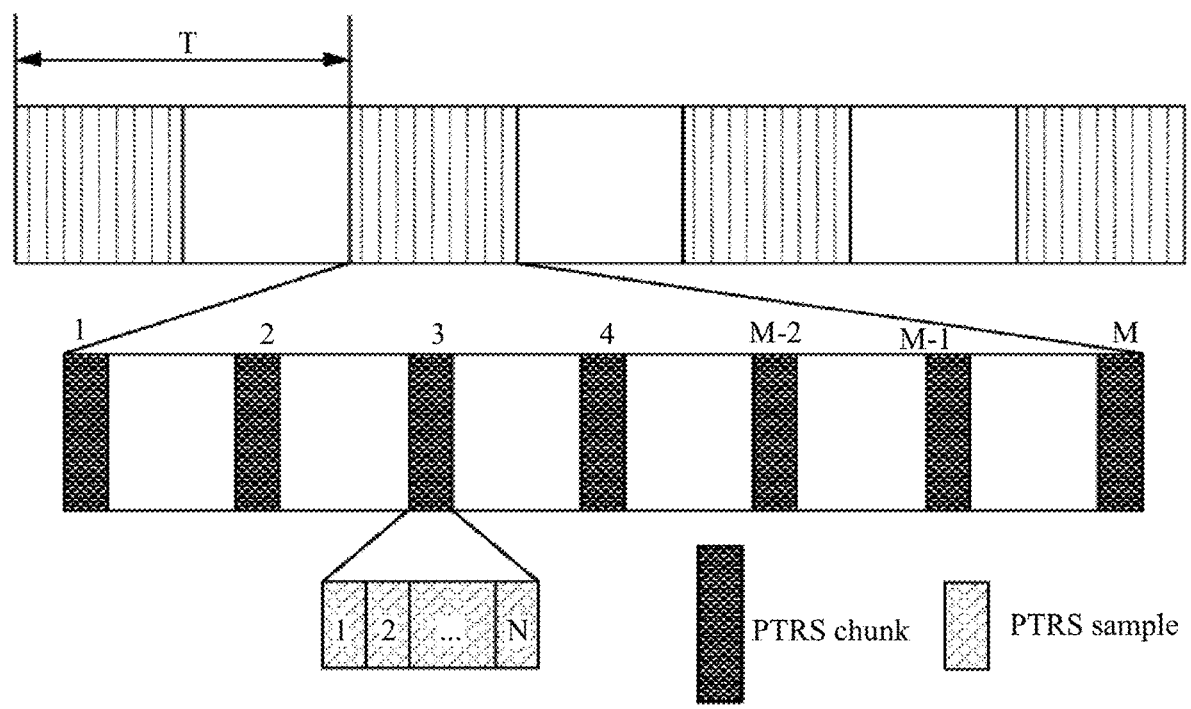
FIG. 3 is a schematic diagram of a PTRS pattern according to an embodiment of this application.

In a scenario in which a PTRS is sent by using a single carrier, when the single-carrier PTRS is mapped in time domain, parameters used to indicate the PTRS pattern include an inter-symbol PTRS time domain density, an intra-symbol PTRS chunk density, and a quantity of PTRS samples. For example, FIG. 3 is a schematic diagram of a PTRS pattern according to an embodiment of this application. In FIG. 3, an inter-symbol PTRS time domain density of the PTRS pattern is 1/T, that is, a PTRS is mapped to one symbol in every T symbols; a PTRS chunk density is M, that is, a symbol to which the PTRS is mapped includes M PTRS chunks; and a quantity of PTRS samples is N, that is, each PTRS chunk includes N PTRS samples.

In this embodiment of this application, a PTRS chunk includes one or more consecutive PTRS signals, and a PTRS sample may be one PTRS signal.

Step 202: The first device maps a PTRS to one or more symbols, and sends the one or more symbols to a second device.

In this embodiment of this application, the first device may be a terminal, and correspondingly, the second device may be a network device; or the first device may be a network device, and correspondingly, the second device may be a terminal.

In step 201, the MCS and the scheduled bandwidth are configured on a network side. The present application is not limited to a specific configuration method.

After determining the at least one of the MCS and the scheduled bandwidth, the first device may determine, from a first association rule, a PTRS chunk density and a quantity of PTRS samples included in a PTRS chunk that are associated with the at least one of the MCS and the scheduled bandwidth, and determine the PTRS chunk density and the quantity of PTRS samples included in a PTRS chunk that are associated with the at least one of the MCS and the scheduled bandwidth, as a PTRS chunk density and a quantity of PTRS samples included in a PTRS chunk that are of the PTRS pattern.

A threshold of the modulation and coding scheme (MCS) and/or a threshold of the scheduled bandwidth that are/is in the first association rule may be determined based on at least one of a phase noise level, a subcarrier spacing, and a frequency. The phase noise level is a phase noise level of the first device, the subcarrier spacing is a subcarrier spacing of a carrier for sending the PTRS, and the frequency is a frequency of the carrier for sending the PTRS.

The first device may determine the threshold of the MCS and/or the threshold of the scheduled bandwidth directly based on the at least one of the phase noise level, the subcarrier spacing, and the frequency. The first device may further feed back the at least one of the phase noise level, the subcarrier spacing, and the frequency to the second device. Therefore, the second device can determine the threshold of the MCS and/or the threshold of the scheduled bandwidth based on information fed back by the first device, and send the determined threshold of the MCS and/or the determined threshold of the scheduled bandwidth to the first device.

This embodiment of the application is not limited to a specific method for determining the threshold of the MCS and/or the threshold of the scheduled bandwidth.

After determining the threshold of the MCS and/or the threshold of the scheduled bandwidth, the first device may send the determined threshold of the MCS and/or the determined threshold of the scheduled bandwidth to the second device. The first device may directly send the threshold of the MCS and/or the threshold of the scheduled bandwidth to the second device; or may send a phase noise level of a terminal to the second device, to indirectly send the threshold of the MCS and/or the threshold of the scheduled bandwidth to the second device.

After determining the threshold of the MCS and/or the threshold of the scheduled bandwidth, the first device may determine the first association rule, that is, an association relationship between the at least one of the threshold of the MCS and/or the threshold of the scheduled bandwidth and the PTRS chunk density and the quantity of PTRS samples included in a PTRS chunk. For example, the first association rule may be shown in Table 1.

when the first scheduled bandwidth interval is $[T_{RB}^1, T_{RB}^2)$, and the first modulation and coding scheme interval is $[T_{MCS}^1, T_{MCS}^2]$, the PTRS chunk density and the quantity of PTRS samples included in a PTRS chunk are both 0.

It should be understood that Table 1 is merely an example of the association relationship between the threshold of the MCS and/or the threshold of the scheduled bandwidth and the PTRS chunk density and the quantity of PTRS samples included in a PTRS chunk. The first association rule may be alternatively in another form. For example, for the thresholds in Table 1, a left threshold may be alternatively set to be less than or equal to a right threshold, to implement any requirement on the associated PTRS chunk density and the associated quantity of PTRS samples included in a PTRS chunk. For example, if $T_{MCS}^2 = T_{MCS}^3$ in Table 1, the second column in Table 1 is invalid; and if $T_{MCS}^2 = T_{MCS}^3$, $T_{MCS}^4 = T_{MCS}^5$, and $T_{RB}^1 = T_{RB}^2 = T_{RB}^3$, $T_{RB}^4 = T_{RB}^5 = +\infty$ in Table 1, the quantity of PTRS samples included in a PTRS chunk is fixed at $N_{33}$ and the PTRS chunk density is fixed at $M_{33}$, under a condition that a PTRS is present. For another example, in Table 1, PTRS chunk densities in all columns may be set to be the same, and quantities of PTRS samples included in PTRS chunks in all rows may be set to be the

TABLE 1

| | First association rule | | | |
|---|---|---|---|---|
| Scheduled | MCS | | | |
| bandwidth | $[T_{MCS}^1, T_{MCS}^2]$ | $[T_{MCS}^2, T_{MCS}^3]$ | $[T_{MCS}^3, T_{MCS}^4]$ | $[T_{MCS}^4, T_{MCS}^5]$ |
| $[0, T_{RB}^1)$ | {0, 0} | {0, 0} | {0, 0} | {0, 0} |
| $[T_{RB}^1, T_{RB}^2)$ | {0, 0} | {$N_{22}, M_{22}$} | {$N_{23}, M_{23}$} | {$N_{24}, M_{24}$} |
| $[T_{RB}^2, T_{RB}^3)$ | {0, 0} | {$N_{32}, M_{32}$} | {$N_{33}, M_{33}$} | {$N_{34}, M_{34}$} |
| $[T_{RB}^3, T_{RB}^4)$ | {0, 0} | {$N_{42}, M_{42}$} | {$N_{43}, M_{43}$} | {$N_{44}, M_{44}$} |
| $[T_{RB}^4, T_{RB}^5)$ | {0, 0} | {$N_{52}, M_{52}$} | {$N_{53}, M_{53}$} | {$N_{54}, M_{54}$} |
| $[T_{RB}^5, +\infty)$ | {0, 0} | {$N_{62}, M_{62}$} | {$N_{63}, M_{63}$} | {$N_{64}, M_{64}$} |

In Table 1, $T_{MCS}^1$, $T_{MCS}^2$, $T_{MCS}^3$, $T_{MCS}^4$, and $T_{MCS}^1$ are MCS thresholds, and $T_{RB}^1$, $T_{RB}^2$, $T_{RB}^3$, $T_{RB}^4$, and $T_{RB}^5$ are scheduled bandwidth thresholds. $N_{22}$ to $N_{64}$ represent quantities of PTRS samples included in PTRS chunks, and $M_{22}$ to $M_{64}$ represent PTRS chunk densities. Different MCS thresholds and different scheduled bandwidth thresholds are mapped to different PTRS chunk densities and different quantities of PTRS samples included in PTRS chunks. For example, when MCS thresholds are $[T_{MCS}^2, T_{MCS}^3)$, and scheduled bandwidth thresholds are $[T_{RB}^1, T_{RB}^3)$, an associated PTRS chunk density is $M_{32}$, and an associated quantity of PTRS samples included in a PTRS chunk is $N_{32}$. In this embodiment of this application, a value of the PTRS chunk density may be 1, 2, or 4, and the quantity of PTRS samples included in a PTRS chunk may be 1, 2, 4, 8, 16, or the like. Certainly, the foregoing values are merely examples. The value of the PTRS chunk density and the quantity of PTRS samples included in a PTRS chunk may be alternatively in other forms, and examples of the other forms are not described herein.

When the scheduled bandwidth is in a first scheduled bandwidth interval, and the modulation and coding scheme is in a first modulation and coding scheme interval, the PTRS pattern is not sent, that is, the PTRS chunk density and the quantity of PTRS samples included in a PTRS chunk are both 0. The first scheduled bandwidth interval and the first modulation and coding scheme interval may be determined based on an actual situation, and details are not described herein. For example, it can be learned from Table 1 that same, so that in the pattern of the single-carrier PTRS in time domain, the quantity of PTRS samples included in a PTRS chunk is determined only by the scheduled bandwidth, and the intra-symbol PTRS chunk density is determined only by the MCS.

Phase noise levels of different terminals are different, phase noise resistance capabilities of different subcarrier spacings are different, phase noise levels corresponding to different frequencies are different, one MCS may be corresponding to different modulation orders/bit rates, and the like. Therefore, the threshold of the MCS in Table 1 is related to all of the phase noise level of the terminal, the subcarrier spacing, the frequency, a correspondence between the MCS and a modulation order/a transport block size number, and the like. That is, phase noise levels of different terminals, different subcarrier spacings, different frequencies, and different correspondences between MCSs and modulation orders/transport block size numbers are corresponding to different association relationships.

In this embodiment of this application, the first association rule may be alternatively established by the second device and then sent to the first device, or may be agreed upon in advance by the first device and the second device.

In this embodiment of this application, the first device may further determine the inter-symbol PTRS time domain density of the PTRS pattern based on the MCS. Further, after determining the MCS, the first device may determine, from a second association rule, an inter-symbol PTRS time domain density associated with the MCS, and determine the inter-symbol PTRS time domain density associated with the MCS, as the inter-symbol PTRS time domain density of the PTRS pattern. The second association rule is an association relationship between the MCS and the inter-symbol PTRS time domain density. The first device may establish the association relationship between the MCS and the inter-symbol PTRS time domain density in advance. The second association rule may be alternatively established by the second device and then sent to the first device, or may be agreed upon in advance by the first device and the second device.

For example, the second association rule may be shown in Table 2.

TABLE 2

Second association rule

| MCS | Inter-symbol PTRS time domain density |
|---|---|
| [MCS1, MCS2] | 0 |
| (MCS2, MCS3] | 1/4 |
| (MCS3, MCS4] | 1/2 |
| (MCS4, MCS5] | 1 |

With reference to Table 2, when the MCS is greater than MCS2 and less than or equal to MCS3, the associated inter-symbol PTRS time domain density is ¼, that is, one symbol to which the PTRS is mapped is sent in every four symbols. For another case, refer to the descriptions herein. Details are not described herein again.

It should be understood that Table 2 is merely an example of the association relationship between the MCS and the inter-symbol PTRS time domain density. The second association rule may be alternatively in another form.

In step 202, the first device may map the PTRS to the one or more symbols for which single-carrier modulation is used, and send the one or more symbols to the second device.

The single carrier may be a discrete Fourier transform spread orthogonal frequency division multiplexing (DFTS-OFDM) waveform, an extended waveform thereof, for example, a ZP-DFTS-OFDM (zero power) waveform, or another single carrier.

In this embodiment of this application, in a multicarrier scenario, the first device may also determine a PTRS pattern based on at least one of an MCS and a scheduled bandwidth. In the multicarrier scenario, the PTRS pattern includes a PTRS time domain density and a PTRS frequency domain density. The PTRS time domain density is a density of symbols to which the PTRS is mapped in time domain, and the PTRS frequency domain density is a density of subcarriers to which the PTRS is mapped in frequency domain.

Further, the first device may determine, from a third association rule based on the MCS, an inter-symbol PTRS time domain density associated with the MCS, and determine the PTRS time domain density associated with the MCS, as the PTRS time domain density of the PTRS pattern. The third association rule is an association relationship between the MCS and the PTRS time domain density. The first device may establish the association relationship between the MCS and the PTRS time domain density in advance, or may receive the third association rule established or modified by the second device, or may agree upon the third association rule in advance with the second device. This is not limiting with respect to this embodiment of this application.

For example, the third association rule may be shown in Table 3.

TABLE 3

Third association rule

| MCS $I_{MCS}$ | Inter-symbol PTRS time domain density |
|---|---|
| $0 \leq I_{MCS} < T_{MCS}^1$ | 0 |
| $T_{MCS}^1 \leq I_{MCS} < T_{MCS}^2$ | Every four symbols |
| $T_{MCS}^2 \leq I_{MCS} < T_{MCS}^3$ | Every two symbols |
| $T_{MCS}^3 \leq I_{MCS} < T_{MCS}^4$ | Every symbol |

In Table 3, $T_{MCS}^1$, $T_{MCS}^2$, $T_{MCS}^3$, $T_{MCS}^4$, and $T_{MCS}^5$ are MCS thresholds.

It should be understood that Table 3 is merely an example of the association rule between the MCS and the PTRS time domain density. The association rule between the MCS and the PTRS time domain density may be alternatively represented in another form, and this is not limiting with respect to this application.

In Table 3, a threshold of the MCS is related to all of the phase noise level of the terminal, the subcarrier spacing, the frequency, a correspondence between the MCS and a modulation order/a transport block size number, and the like. That is, phase noise levels of different terminals, different subcarrier spacings, different frequencies, and different correspondences between MCSs and modulation orders/transport block size numbers are corresponding to different association relationships. For example, for the thresholds in Table 3, a left threshold may be alternatively set to be less than or equal to a right threshold, to implement any requirement on the PTRS time domain density. For example, if $T_{MCS}^1=T_{MCS}^4$ in Table 3, the PTRS time domain density does not support ¼; if $T_{MCS}^1=T_{MCS}^2=T_{MCS}^3$ in Table 3, the PTRS time domain density supports only 0 and 1.

The first device determines, from a fourth association rule based on the scheduled bandwidth, a PTRS frequency domain density associated with the scheduled bandwidth, and determines the PTRS frequency domain density associated with the scheduled bandwidth, as the PTRS frequency domain density of the PTRS pattern. The fourth association rule is an association relationship between the scheduled bandwidth and the PTRS frequency domain density. The first device may establish the association relationship between the scheduled bandwidth and the PTRS frequency domain density in advance, or may receive the fourth association rule established or modified by the second device, or may agree upon the fourth association rule in advance with the second device. This is not limiting with respect to this embodiment of this application.

For example, the fourth association rule may be shown in Table 4.

TABLE 4

Fourth association rule

| Scheduled bandwidth $N_{RB}$ | PTRS frequency domain density |
|---|---|
| $0 \leq N_{RB} < T_{RB}^1$ | 0 |
| $T_{RB}^1 \leq N_{RB} < T_{RB}^2$ | Every resource block |
| $T_{RB}^2 \leq N_{RB} < T_{RB}^3$ | Every two resource blocks |
| $T_{RB}^3 \leq N_{RB} < T_{RB}^4$ | Every four resource blocks |
| $T_{RB}^4 \leq N_{RB} < T_{RB}^5$ | Every eight resource blocks |
| $T_{RB}1 \leq N_{RB}$ | Every 16 resource blocks |

In Table 4, $T_{RB}^1$, $T_{RB}^2$, $T_{RB}^3$, $T_{RB}^4$, and $T_{RB}^5$ are scheduled bandwidth thresholds.

For the thresholds in Table 4, a left threshold may be alternatively set to be less than or equal to a right threshold, to implement any requirement on the associated PTRS frequency domain density. For details, refer to the foregoing descriptions. Details are not described herein again.

It should be understood that Table 4 is merely an example of the association relationship between the scheduled bandwidth and the PTRS frequency domain density. The association relationship between the scheduled bandwidth and the PTRS frequency domain density may be alternatively represented in another form, and this is not limiting with respect to this application.

Figure 5:
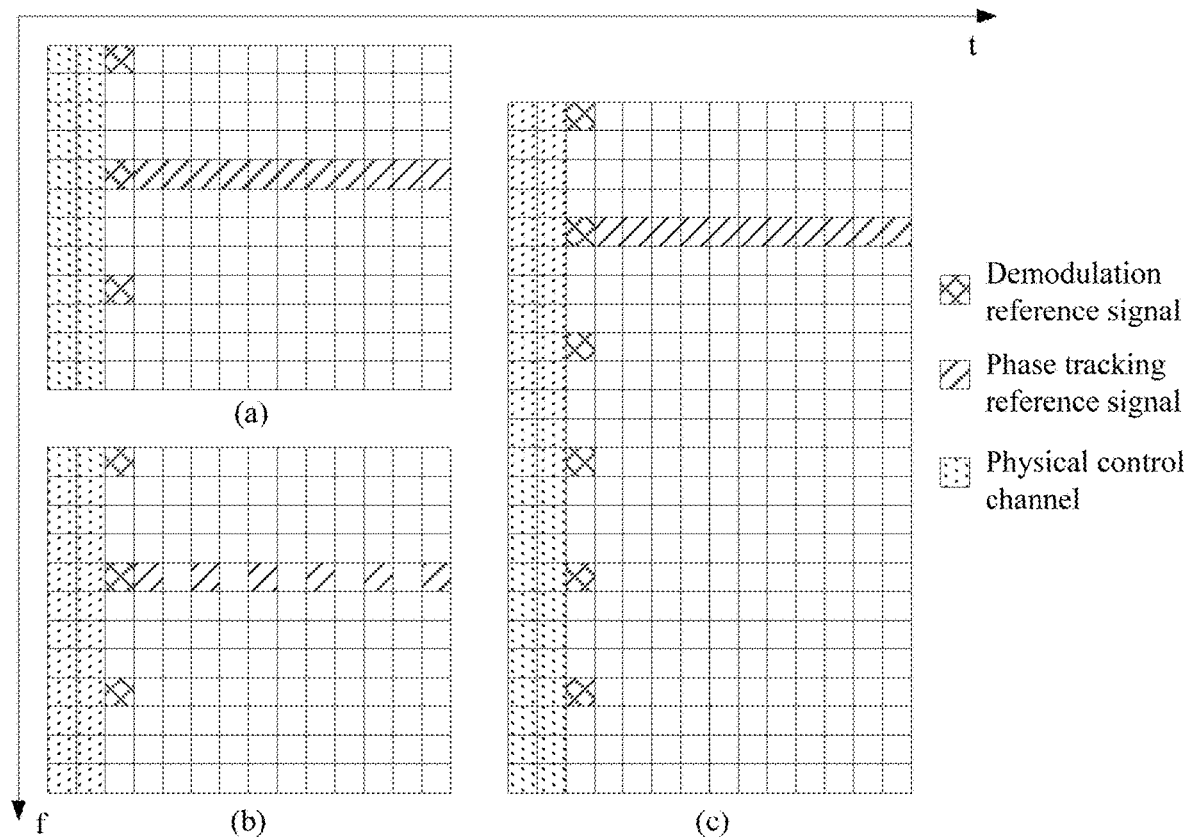
FIG. 5 is a schematic diagram of PTRS patterns according to an embodiment of this application.

For example, with reference to Table 3 and Table 4, FIG. 5 is a schematic diagram of PTRS patterns according to an embodiment of this application. In (a) in FIG. 5, a PTRS frequency domain density is 1 (there is one PTRS on each resource block in frequency domain), and a PTRS time domain density is 1; in (b) in FIG. 5, a PTRS frequency domain density is 1 (there is one PTRS on each resource block in frequency domain), and a PTRS time domain density is ½; and in (c) in FIG. 5, a PTRS frequency domain density is ½ (there is one PTRS on every two resource blocks in frequency domain), and a PTRS time domain density is 1.

In the foregoing embodiments, the PTRS patterns are implicitly configured. In the following embodiment, a PTRS pattern is explicitly configured.

Figure 13:
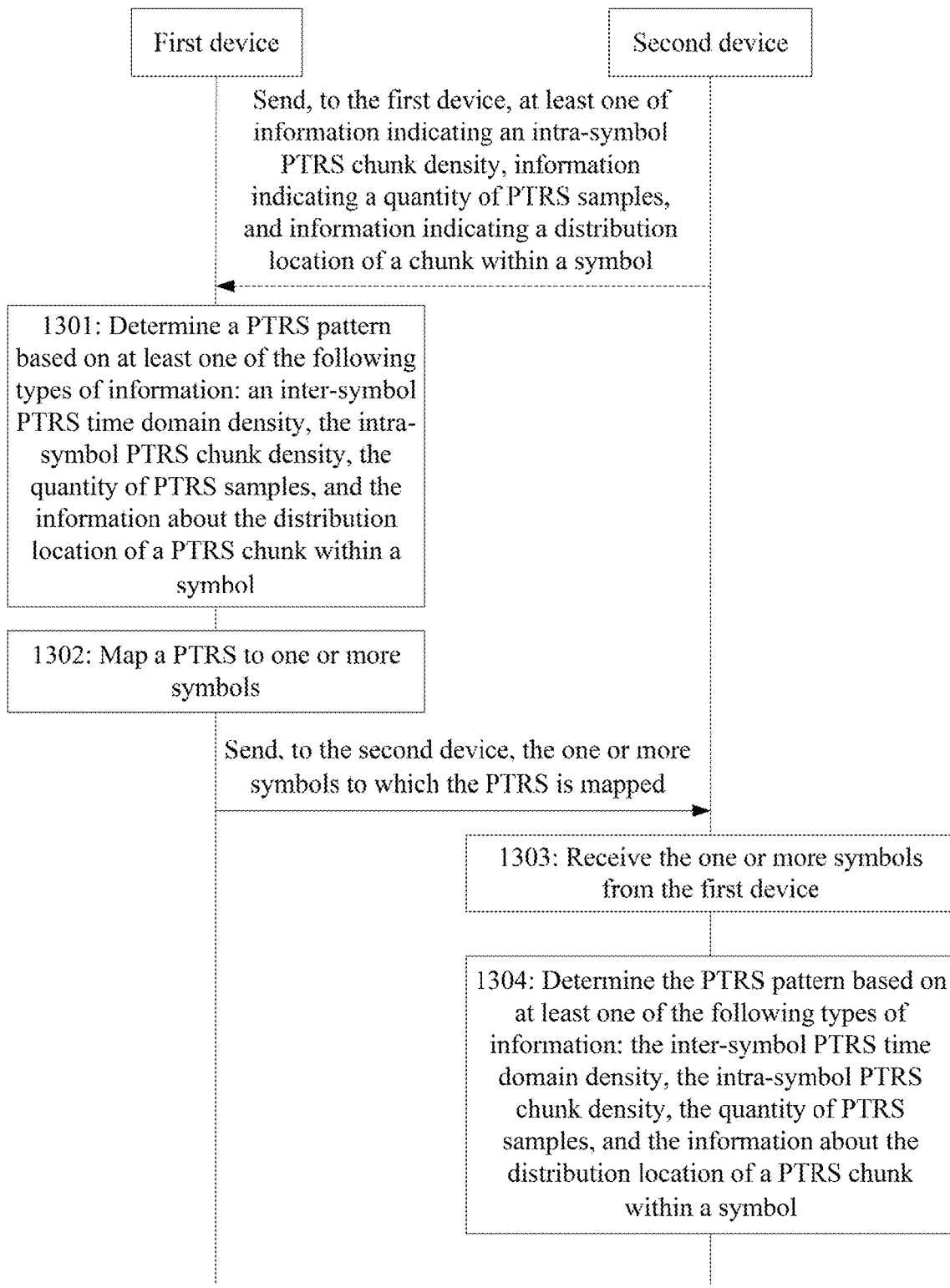
FIG. 13 is a schematic interaction diagram of a communication method according to an embodiment of this application.

FIG. 13 is a schematic flowchart of a communication method according to an embodiment of this application. The method includes the following steps.

Step 1301: A first device determines a PTRS pattern based on at least one of the following types of information: an inter-symbol PTRS time domain density, an intra-symbol PTRS chunk density, a quantity of PTRS samples, and a distribution location of a chunk within a symbol.

The inter-symbol PTRS time domain density means a quantity of symbols in which one symbol is mapped to a PTRS. For example, if the inter-symbol PTRS time domain density is ¼, it indicates that the PTRS is mapped to one symbol in every four OFDM symbols.

The intra-symbol PTRS chunk density is a quantity of PTRS chunks included in one symbol.

The distribution location of a chunk within a symbol is information about a mapped location of a PTRS chunk within one symbol, for example, whether the PTRS chunk is mapped to a front part, a middle part, or a rear part of a symbol, or a specific modulation symbol or specific data.

The quantity of PTRS samples is a quantity of samples included in one PTRS chunk.

Figure 14:
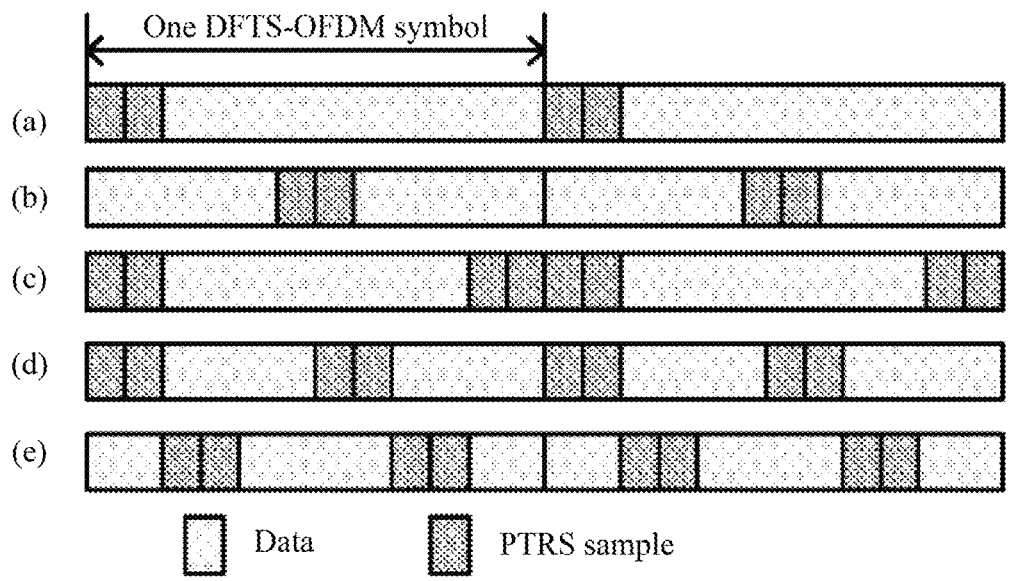
FIG. 14 is a schematic diagram of PTRS patterns according to an embodiment of this application.

For example, as shown in FIG. 14(a), an intra-symbol PTRS chunk density is 1 because one symbol includes one PTRS chunk; a quantity of PTRS samples is 2 because one PTRS chunk includes two samples; and a distribution location of a chunk within a symbol is a front end.

It should be understood that the foregoing PTRS chunk density may also be referred to as a quantity of PTRS chunks, and the quantity of PTRS samples may also be referred to as a PTRS chunk size. This is not limiting with respect to the present application.

Step 1302: The first device maps the PTRS to one or more symbols, and sends the one or more symbols to a second device.

Step 1303: The second device receives the one or more symbols from the first device.

Step 1304: The second device determines the PTRS pattern from the one or more symbols.

Optionally, before step 1301, the method further includes the following step:

Step A: The second device sends, to the first device, at least one of information indicating the intra-symbol PTRS chunk density, information indicating the quantity of PTRS samples, and information indicating the distribution location of a chunk within a symbol.

For example, FIG. 3 is a schematic diagram of a PTRS pattern according to an embodiment of this application. In FIG. 3, an inter-symbol PTRS time domain density of the PTRS pattern is 1/T, that is, a PTRS is mapped to one symbol in every T symbols; a PTRS chunk density is M, that is, a symbol to which the PTRS is mapped includes M PTRS chunks; and a quantity of PTRS samples is N, that is, each PTRS chunk includes N PTRS samples.

In this embodiment of this application, a PTRS chunk includes one or more consecutive PTRS signals, and a PTRS sample may be one PTRS signal before discrete Fourier transform (DFT).

In this embodiment of this application, the first device may be a terminal, and correspondingly, the second device may be a network device; or the first device may be a network device, and correspondingly, the second device may be a terminal.

It should be understood that the inter-symbol time domain density may be implicitly indicated by using an MCS. For an indication manner, refer to Table 2 or Table 3 mentioned in the foregoing embodiment. Details are not described herein again.

When the network device sends PTRS presence/pattern configuration information to the terminal, indication may be implemented in the following manners.

For the quantity of PTRS samples included in a PTRS chunk, there are two manners of configuring the parameter by using signaling.

First manner: The quantity of PTRS samples is indicated directly. For example, a value of the quantity of PTRS samples is directly configured by using signaling. For example, if the quantity of PTRS samples is 8, the quantity of PTRS samples is identified by four bits 1000. For example, if the quantity of PTRS samples is 2, the quantity of PTRS samples is identified by two bits 10.

Second manner: The quantity of PTRS samples is indicated indirectly by indicating a serial number or an index. For example, quantities of PTRS samples are numbered, or a mapping relationship between a serial number and a quantity of PTRS samples is established. For example, the quantity of PTRS samples is indicated by indicating a serial number. For example, there are four values for quantities of PTRS samples, and in this case, indication information occupies two bits. Table 7 is used as an example.

TABLE 7

| Serial number/ Specific content of signaling | Quantity of PTRS samples | Example 1 | Example 2 | Example 3 | Example 4 | Example 5 | Example 6 |
|---|---|---|---|---|---|---|---|
| 0/00 | $N_1$ | 1 | 8 | 2 | 16 | 1 | 2 |
| 1/01 | $N_2$ | 2 | 4 | 4 | 8 | 2 | 4 |
| 2/10 | $N_3$ | 4 | 2 | 8 | 4 | 4 | 8 |
| 3/11 | $N_4$ | 8 | 1 | 16 | 6 | Reserved | Reserved |

In Table 7, when a serial number is 1 (bits are 01), an identified quantity of PTRS samples may be 2 (example 1); or when a serial number is 1, an identified quantity of PTRS samples is 4 (example 2).

It should be noted that values in the table are merely examples. The present application is not limited to specific values. Mapping relationships between serial numbers and quantities of PTRS samples may be presented in ascending order, in descending order, or in another manner. A quantity of elements in a value set of the quantity of PTRS samples (that is, a maximum value of i in $N_i$) may be 4 or another number. A specific value of the quantity of PTRS samples (that is, a specific value of $N_i$) may be 1, 2, 4, 8, or another number. In this manner, one or more mapping relationships between serial numbers and quantities of PTRS samples are established in advance. Compared with direct configuration, this manner can reduce configuration signaling overheads.

For the intra-symbol PTRS chunk density, there are two manners of configuring the intra-symbol PTRS chunk density by using signaling.

First manner: The intra-symbol PTRS chunk density is configured directly. For example, if the intra-symbol PTRS chunk density is 4, the intra-symbol PTRS chunk density is identified by three bits 100. For example, if the intra-symbol PTRS chunk density is 2, the intra-symbol PTRS chunk density is identified by two bits 10.

Second manner: The intra-symbol PTRS chunk density is indicated indirectly by using a serial number or an index. Table 8 is used as an example.

TABLE 8

| Serial number/ Specific content of signaling | Intra-symbol PTRS chunk density | Example 1 | Example 2 | Example 3 | Example 4 | Example 5 | Example 6 |
| --- | --- | --- | --- | --- | --- | --- | --- |
| 0/00 | $M_1$ | 0 | 4 | 0 | 8 | 0 | 2 |
| 1/01 | $M_2$ | 1 | 2 | 2 | 4 | 2 | 4 |
| 2/10 | $M_3$ | 2 | 1 | 4 | 2 | 4 | 8 |
| 3/11 | $M_4$ | 4 | 0 | 8 | 0 | Reserved | Reserved |

It should be noted that what is shown in the table is merely an example. The present application is not limited to specific content of signaling. Mapping relationships between serial numbers and intra-symbol PTRS chunk densities may be presented in ascending order, in descending order, or in another manner. A quantity of elements in a value set of the intra-symbol PTRS chunk density (that is, a maximum value of i in $M_i$) may be 4 or another number. A specific value of the intra-symbol PTRS chunk density (that is, a specific value of $M_i$) may be 1, 2, 4, 8, or another number. In this manner, one or more mapping relationships between serial numbers and intra-symbol PTRS chunk densities are established in advance. Compared with direct configuration, this manner can reduce configuration signaling overheads.

For configuration of the distribution location of a chunk within a symbol, a plurality of requirements need to be considered, for example, requirements such as a quantity of chunks, a service requirement, a phase noise estimation algorithm at a receive end, and a time-domain correlation of phase noise.

If a current intra-symbol PTRS chunk density is 1, that is, one symbol includes only one PTRS chunk, a distribution location of the PTRS chunk may be at a front end or in a middle of the symbol. For example, if a current service has a relatively high requirement on a latency, it is required that phase noise be estimated as early as possible by using the PTRS, and therefore, the distribution location of the PTRS chunk may be at the front end of the symbol, as shown in FIG. 14(a); if a current service has a relatively high requirement on estimation accuracy, the distribution location of the PTRS chunk may be in the middle of the symbol, as shown in FIG. 14(b), considering that the entire symbol includes only one PTRS chunk.

If a current intra-symbol PTRS chunk density is 2, that is, one symbol includes only two PTRS chunks, there are a relatively large quantity of location distribution manners for the PTRS chunks. For example, when the time-domain correlation of phase noise is relatively strong, and a coherence time of the phase noise is longer than or equal to a time of one symbol, the two PTRS chunks may be distributed at two ends of the symbol, as shown in FIG. 14(c); when the time-domain correlation of phase noise is relatively weak, or the receive end can estimate the phase noise in combination with at least two adjacent symbols, one of the two PTRS chunks may be placed at a front end of the symbol, and the other placed in a middle of the symbol, as shown in FIG. 14(d); if it is considered that a relatively large quantity of phase estimates of the last symbol in FIG. 14(d) are obtained through extrapolation, the following operation may be alternatively considered: adding a time offset to overall chunk distribution in FIG. 14(d), so that the quantity of the phase estimates obtained through extrapolation are evenly distributed in the first symbol and the last symbol, as shown in FIG. 14(e). If it is further considered that PTRSs of different terminals may be mapped to different locations, different time domain offsets K may be configured for the different terminals, where K represents duration of K data symbols/modulation symbols before DFT.

If the quantity of chunks is a value other than 1 and 2, a distribution manner of locations of the chunks is similar to that of the two PTRS chunks, and may be any one in FIG. 14(c) to FIG. 14(e).

The distribution location of a chunk within a symbol may be implicitly indicated based on the intra-symbol PTRS chunk density and/or the quantity of PTRS samples, or may be explicitly indicated directly.

Figure 15:
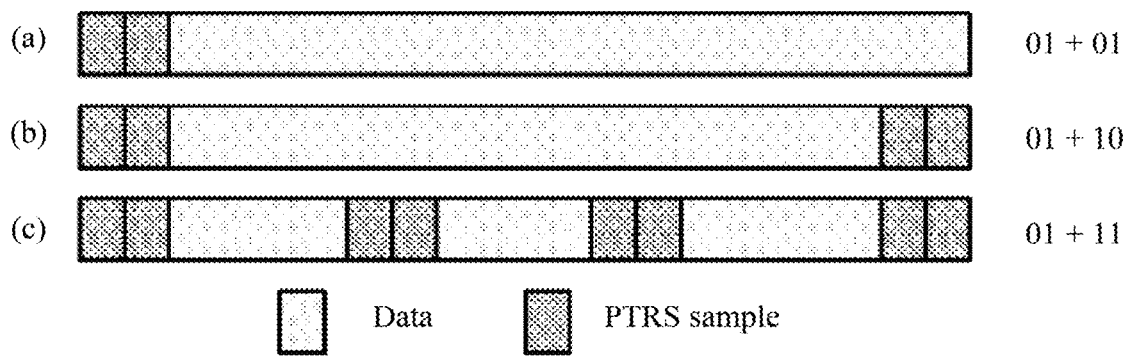
FIG. 15 is a schematic diagram of PTRS patterns according to an embodiment of this application.

Implicit indication is applicable only to a case in which a distribution set is configured in advance by using signaling. For example, if current distribution sets configured by using signaling are shown in FIG. 14(a) and FIG. 14(c), a distribution location of a chunk may be directly determined based on an intra-symbol PTRS chunk density and/or a quantity of PTRS samples. For example, distribution of one chunk is shown in FIG. 14(a), and distribution of two or more chunks is shown in FIG. 14(c). In this case, the intra-symbol PTRS chunk density and the quantity of PTRS samples may be directly indicated. The examples 1 in Table 7 and Table 8 are used as examples. As shown in FIG. 15, the first two bits represent a quantity of PTRS samples, and the last two bits represent an intra-symbol PTRS chunk density.

In a case of explicit indication, based on a predefined serial number and location distribution manner, the distribution location of a chunk may be directly indicated by notifying the serial number by using signaling, as shown in Table 9.

TABLE 9

| Serial number/ Specific content of signaling | Chunk location | Example 1 | Example 2 |
| --- | --- | --- | --- |
| 0/00 | Distribution 1 | Front | Front |
| 1/01 | Distribution 2 | Middle | Middle |
| 2/10 | Distribution 3 | Even distribution | Two ends |
| 3/11 | Distribution 4 | Reserved | Even distribution |

Figure 16:
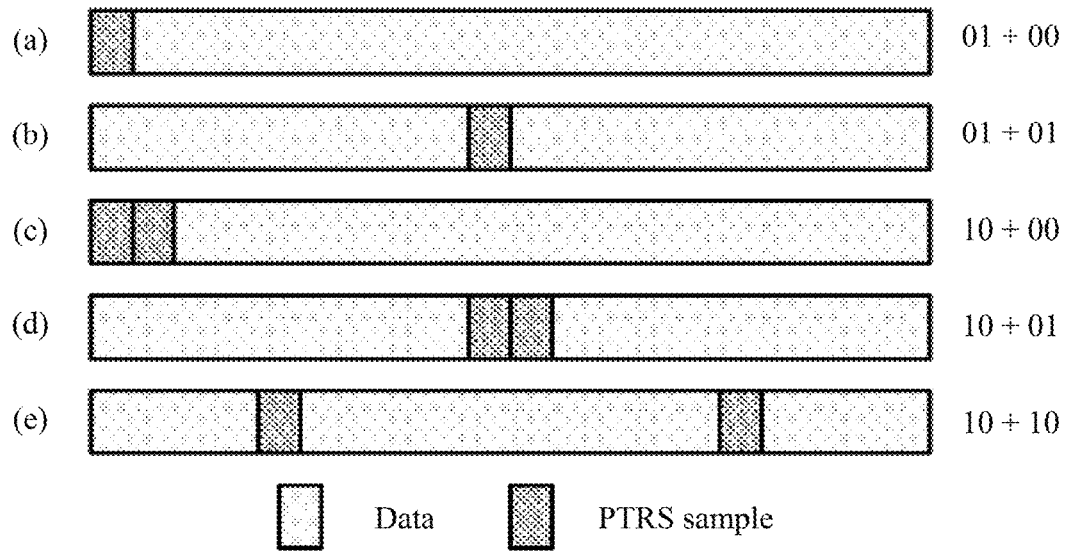
FIG. 16 is a schematic diagram of PTRS patterns according to an embodiment of this application.

"Front" and "middle" are only for one PTRS chunk, and two ends and even distribution are for at least two PTRS chunks. Therefore, in this case, a total quantity of PTRS samples may be notified by using signaling, and a specific PTRS pattern can be determined with reference to a location distribution manner. For example, if signaling content that indicates total quantities of PTRS samples is {00, 01, 10, 11}, respectively corresponding to the total quantities of PTRS samples {0, 1, 2, 4}, the example 1 in the foregoing table is used as an example. As shown in FIG. 16, the first two bits represent a total quantity of PTRS samples, and the last two bits represent a distribution location of a PTRS chunk. If a total quantity is 1, a PTRS chunk density can only be 1, and a quantity of PTRS samples included in a PTRS chunk can also be 1 only. Therefore, if a distribution location is at a front end, a PTRS pattern is shown in FIG. 16(a). If a total quantity is 2, and a distribution location is in a middle, a PTRS chunk density can also be 1 only, that is, a quantity of PTRS samples included in a PTRS chunk is 2 in this case, with distribution shown in FIG. 16(d).

Figure 17:
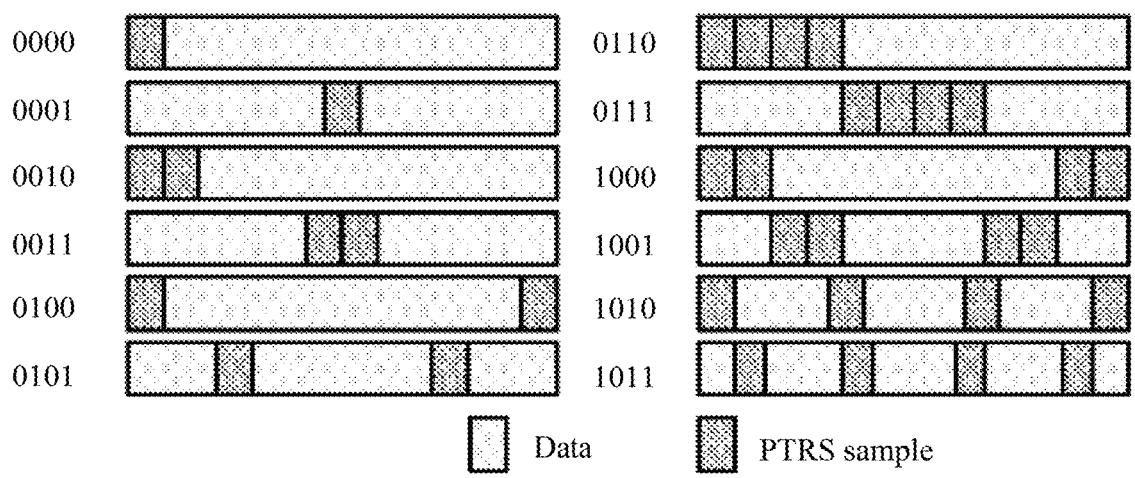
FIG. 17 is a schematic diagram of PTRS patterns according to an embodiment of this application.

In addition, the foregoing three parameters may be jointly numbered. For example, 0000 represents that a chunk density is 1, a quantity of PTRS samples is 1, and a distribution location is at a front end; 0001 represents that a chunk density is 1, a quantity of PTRS samples is 1, and a distribution location is in a middle; 0010 represents that a chunk density is 1, a quantity of PTRS samples is 2, and a distribution location is at a front end; 0011 represents that a chunk density is 1, a quantity of PTRS samples is 2, and a distribution location is in a middle; and the like. An idea of this manner is to use a plurality of bits to represent all possible PTRS patterns. For example, if a quantity of all possible PTRS patterns is 20, the PTRS patterns are identified by five bits. Binary numbers, and mapping relationships between the binary numbers and PTRS patterns shown in FIG. 17 are merely examples, and do not constitute any limitation on this embodiment of this application.

It should be noted that the foregoing tables and figures are merely examples. A mapping relationship between a serial number and a PTRS pattern may be alternatively represented in another form, such as a formula.

It should be understood that configuration of the foregoing parameters may be completed in any one or more of the following manners: radio resource control (RRC) signaling, medium access control (MAC) control element (CE) signaling, downlink control information (DCI) signaling, or pre-definition. For example, any one of the foregoing types of signaling is used directly to configure the PTRS parameters, including the PTRS chunk density, the quantity of PTRS samples, and the distribution location of a chunk within a symbol. Configuration signaling for the parameters may be the same, or may be different. The parameters may be configured separately, or may be configured jointly. Configuration periods may be the same, or may be different. The foregoing PTRS parameters may be alternatively configured jointly by using a plurality of types of signaling: The RRC signaling is used to configure a parameter set 1, and the DCI signaling is used to configure a specific parameter, where the parameter configured by using the DCI signaling is an element in the parameter set 1 configured by using the RRC signaling. For example, a plurality of mapping relationships (a mapping relationship 1, a mapping relationship 2, . . . ) between serial numbers and PTRS parameters/patterns are predefined, the RRC signaling is used to configure one of the mapping relationships (a serial number of the mapping relationship may be used to determine the specific mapping relationship, for example, 2 represents that the mapping relationship 2 is selected), and a PTRS parameter/pattern configured by using the DCI signaling is one of PTRS parameters/patterns in the mapping relationship 2. Alternatively, the MAC CE signaling is used to configure a parameter set 1, and the DCI signaling is used to configure a specific parameter, where the parameter configured by using the DCI signaling is an element in the parameter set 1 configured by using the MAC CE signaling. Alternatively, the RRC signaling is used to configure a parameter set 1, the MAC CE signaling is used to configure a parameter subset 1, where a parameter in the subset 1 is an element in the parameter set 1 configured by using the RRC signaling, and the DCI signaling is used to configure a specific parameter based on the subset 1. Alternatively, based on a predefined parameter or parameter set, the RRC signaling, the MAC CE signaling, and the DCI signaling are used to modify the predefined parameter or parameter set. Alternatively, based on a currently selected parameter or parameter set, the RRC signaling, the MAC CE signaling, and the DCI signaling are used to modify a predefined parameter or parameter set.

In this embodiment of this application, after an inter-symbol PTRS time domain density, an intra-symbol PTRS chunk density, and a quantity of PTRS samples that are of a single-carrier PTRS pattern are determined, a time domain offset of the PTRS pattern may further need to be determined, so as to map the PTRS to a symbol accurately. Correspondingly, after a PTRS time domain density and a PTRS frequency domain density that are of a multicarrier PTRS pattern are determined, a time domain offset and a frequency domain offset that are of the PTRS pattern may further need to be determined, so as to map the PTRS to a symbol accurately. The following provides descriptions separately.

Time Domain Offset:

When the inter-symbol PTRS time domain density or the PTRS time domain density is not 1, which symbol the PTRS is to be placed on needs to be considered. Main points to be considered include the following.

(1) Conflicts with another channel and another reference signal (RS): A physical downlink control channel (PDCCH) does not require a PTRS, and a symbol in which a DMRS is located does not require a PTRS. Therefore, an offset is greater than or equal to $N_{symbols}^{PDCCH} + N_{symbols}^{DMRS}$, where $N_{symbols}^{PDCCH}$ is a quantity of symbols occupied by a PDCCH that is in a same time domain unit as the PTRS, and $N_{symbols}^{DMRS}$ is a quantity of symbols occupied by a DMRS that is in a same time domain unit as the PTRS. The time domain unit may be a slot, an aggregated slot, or the like.

(2) Phase noise estimation performance: Phase noise of a symbol with no PTRS is obtained by performing interpolation (if a current symbol is a symbol with no PTRS, and symbols with the PTRS exist on both a left side and a right side of the current symbol, interpolation may be performed to obtain phase noise of the current symbol) or extrapolation (if a current symbol is a symbol with no PTRS, and a symbol with the PTRS exists on only one side of the current symbol, only extrapolation can be performed) based on estimated phase noise of a symbol with the PTRS. Phase noise obtained through extrapolation is less accurate than that obtained through interpolation. Therefore, in an actual case, symbols for which extrapolation needs to be performed should be as few as possible, or extrapolation needs to be avoided. In addition, when channel estimation is performed by using the DMRS, phase noise is estimated as part of a channel, and phase noise estimated by using the PTRS is a difference between actual phase noise and phase noise of the symbol in which the DMRS is located. Therefore, a phase noise difference of the symbol in which the DMRS is located may be considered as 0, and interpolation is performed based on 0 and estimated phase noise of the first symbol with the PTRS.

Figure 4:
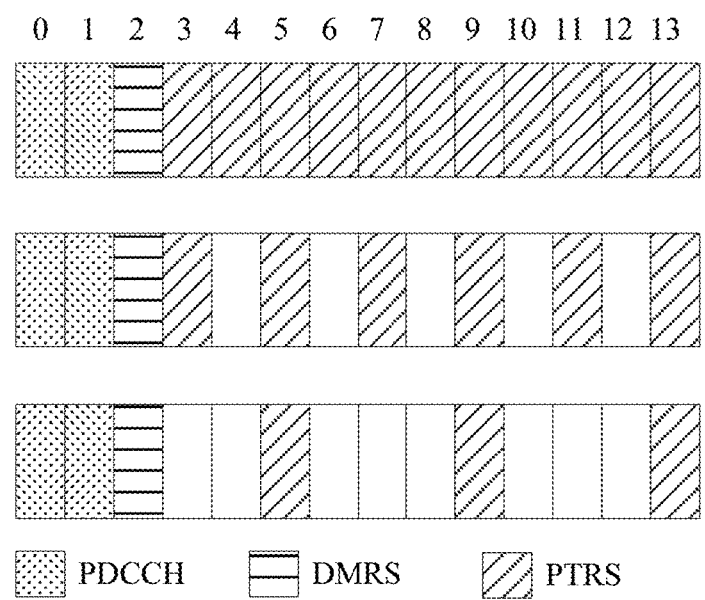
FIG. 4 is a schematic diagram of PTRS patterns according to an embodiment of this application.

In consideration of the foregoing case, when the quantity of symbols of the PDCCH is 2, and the quantity of symbols of the DMRS is 1, the PTRS pattern corresponding to the PTRS time domain density between three types of symbols or the PTRS time domain density may be shown in FIG. 4 and Table 5.

TABLE 5

| Inter-symbol PTRS time domain density | Offset 1 | Offset 2 | Total offset $T_{offset}$ |
|---|---|---|---|
| 1 | $N_{symbols}^{PDCCH} + N_{symbols}^{DMRS}$ | 0 | 3 |
| 1/2 | $N_{symbols}^{PDCCH} + N_{symbols}^{DMRS}$ | 0 | 3 |
| 1/4 | $N_{symbols}^{PDCCH} + N_{symbols}^{DMRS}$ | 2 | 5 |

A value of the offset 2 may be related or unrelated to a value of the offset 1.

The total offset $T_{offset}$ may be alternatively represented as:

$$T_{offset} = H - 1 - (\lceil K/L \rceil - 1) \cdot L,$$

where

K represents a quantity of symbols, excluding symbols of a PDCCH and a DMRS, in a time domain unit; L represents a reciprocal of an inter-symbol PTRS time domain density or a PTRS time domain density, and has a value of 1, 2, or 4; H may represent a total quantity of symbols in the time domain unit, and the time domain unit may be a slot or may be an aggregated slot; and $\lceil \, \rceil$ represents rounding up.

Based on the total offset, a sequence number of a symbol to which a PTRS is mapped in a time domain unit may be represented as:

$$I_{symbol}^{PTRS} = T_{offset} + n \cdot L,$$

$$n = 0, 1, 2, \ldots$$

When the foregoing content is used for uplink, similar operations may be performed.

Frequency Domain Offset:

conflicts with another channel and another RS (excluding a DMRS): a conflict with a channel state information-reference signal (CSI-RS)

a conflict with a direct current (DC) subcarrier

Solutions to the foregoing two types of conflicts each may be any of the following.

First method: If a location of a DC subcarrier and a location of another RS (excluding a DMRS) are determined to be only on a subcarrier RSset={SC sequence number}, where the subcarrier (SC) sequence number is a serial number in one resource block (RB), that is, a value of the SC sequence number is from 0 to 11, a conflict with the foregoing subcarrier sequence number may be avoided by setting a frequency domain offset $F_{offset}$ during design of a PTRS. For example:

$$F_{offset} = \min(RSset) - 1;$$

or $$F_{offset} = \max(RSset) + 1;$$

or $$F_{offset} \in SCset - RSset,$$

where SCset is a set of all serial numbers in one RB, and elements of the set include 0, 1, . . . , and 11; or further considering that a location of the PTRS is the same as a location of a DMRS, the frequency domain offset may be represented as:

$$F_{offset} \in (SCset - RSset) \cap DMRSset,$$

where DMRSset is a subcarrier serial number set that is possible for the DMRS, and element values are from 0 to 11.

Second method: In a case of a conflict with another RS or DC subcarrier, precedence is given to the other RS or DC subcarrier, that is, a PTRS is not mapped to a location of the conflict with the other RS or DC subcarrier.

Alternatively, the first method may be first considered. If the conflict cannot be avoided, the second method is used.

Further, with reference to the foregoing descriptions, in FIG. 4, a time domain offset of each PTRS pattern is three symbols; and in each PTRS pattern in (a) to (c) in FIG. 5, a time domain offset is three symbols, and a frequency domain offset is four subcarriers.

In the prior art, a port for sending a PTRS is usually a fixed port. When a quantity of PTRS ports is much greater than a quantity of required ports, overheads are relatively high. That is, a fixed port is used in the prior art, resulting in poor flexibility in different scenarios, for example, in cases of different intermediate radio frequency hardware links.

In this embodiment of this application, to more flexibly configure a port for scheduling a PTRS, the network device determines, based on capability information fed back by the terminal, a quantity of PTRS ports for sending the PTRS, and an association relationship with a DMRS. The following provides detailed descriptions.

The network device obtains PTRS port configuration reference information, where the PTRS port configuration reference information includes at least one of the following: shared local oscillator information of the terminal, or a common phase error (CPE) measured on each PTRS port when the terminal is in full configuration of PTRS ports; a quantity of DMRS port groups; a quantity of layers to be scheduled to the terminal; and a maximum quantity of PTRS ports. The maximum quantity of PTRS ports is a maximum quantity of ports used by the terminal to send a PTRS. One DMRS port group includes one or more DMRS ports, and signals of all the DMRS ports are sent from a same intermediate radio frequency link.

The shared local oscillator information of the terminal or the CPE measured on each PTRS port when the terminal is in full configuration of PTRS ports, and the maximum quantity of PTRS ports may be reported by the terminal to the network device. It should be noted that the terminal may alternatively not report the maximum quantity of PTRS ports to the network device. In this case, the network device may configure PTRS ports in full configuration for the terminal. When the terminal reports the maximum quantity of PTRS ports to the network device, the network device may determine a specific quantity of PTRS ports to be configured for the terminal. For example, if the terminal already reports that the maximum quantity of PTRS ports supported by the terminal is 2, when the quantity of layers to be scheduled is greater than the maximum quantity of PTRS ports, the network device may configure a maximum of only two PTRS ports for the terminal. This can further reduce PTRS overheads.

Then, the network device determines, based on the PTRS port configuration reference information, the quantity of PTRS ports used by the terminal to send the PTRS.

Further, if the network device determines, based on the shared local oscillator information of the terminal, that a plurality of intermediate radio frequency links of the terminal do not share one crystal oscillator unit, and determines that the quantity of layers to be scheduled to the terminal is less than or equal to the maximum quantity of PTRS ports, the network device determines the quantity of layers to be scheduled to the terminal, as the quantity of PTRS ports.

If the network device determines, based on the shared local oscillator information of the terminal, that a plurality of intermediate radio frequency links of the terminal do not share one crystal oscillator unit, and determines that the quantity of layers to be scheduled to the terminal is greater than the maximum quantity of PTRS ports, the network device determines the maximum quantity of PTRS ports as the quantity of PTRS ports.

If the network device determines, based on the shared local oscillator information of the terminal, that a plurality of intermediate radio frequency links of the terminal share one crystal oscillator unit, the network device determines that the quantity of PTRS ports is greater than or equal to 1 and less than or equal to the quantity of DMRS port groups. The specific quantity of PTRS ports may be determined based on an actual situation. For example, if phase noise levels of intermediate radio frequency links of all DMRS port groups on a network side are relatively ideal, the quantity of PTRS ports may be configured as 1; if phase noise levels of intermediate radio frequency links of all DMRS port groups on a network side are relatively low, the quantity of PTRS ports may be configured as the quantity of DMRS port groups. When the quantity of PTRS ports is less than the quantity of DMRS port groups, a mapping relationship, for example, a quasi co-location (QCL) relationship, between the PTRS port and a DMRS port group needs to be notified, or be established according to a predefined rule or a rule agreed upon in advance.

For example, the quantity, of PTRS ports used by the terminal to send the PTRS, determined by the network device may be shown in Table 6.

TABLE 6

| Quantity of layers to be scheduled | Shared local oscillator information of the terminal | Quantity of DMRS port groups | Quantity of PTRS ports |
| --- | --- | --- | --- |
| N | Yes | M (1 ≤ M ≤ N) | K (1 ≤ K ≤ M) |
| N | No | M (1 ≤ M ≤ N) | N (N ≤ Nmax, and Nmax is the maximum quantity of PTRS ports) |
| N | No | M (1 ≤ M ≤ N) | Nmax (Nmax < N) |

After determining the quantity of PTRS ports used by the terminal to send the PTRS, the network device determines, based on the association relationship between the PTRS port and the DMRS port group, the DMRS port group associated with the PTRS port. The association relationship between the PTRS port and the DMRS port group may be determined by using a plurality of methods. This is not limiting with respect to this embodiment of this application.

Each DMRS port group includes at least one DMRS port, and a specific quantity of PTRS ports associated with each DMRS port group is determined based on an actual situation. The following provides descriptions by using an example in which one DMRS port group is associated with P PTRS ports. For another case, refer to the descriptions herein. Details are not described herein again. P is greater than or equal to 1 and less than or equal to Q, where Q is a quantity of DMRS ports included in the DMRS port group associated with the P PTRS ports.

The network device determines, based on an association rule, an association relationship between the P PTRS ports and the Q DMRS ports in the DMRS port group associated with the P PTRS ports, where the association relationship between the PTRS ports and the Q DMRS ports in the DMRS port group means that a DMRS port in the DMRS port group and the PTRS port have a same precoding matrix, including digital and analog precoding matrices. For example, an association relationship between a plurality of PTRS ports and a plurality of DMRS ports in the DMRS port group is determined.

The network device sends the association relationship between the P PTRS ports and the Q DMRS ports in the DMRS port group to the terminal.

The association rule may be any one or more of the following.

If one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . .

Figure 6:
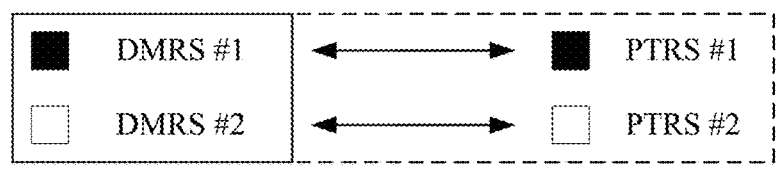
FIG. 6 is a schematic diagram of an association relationship between DMRS ports and PTRS ports according to an embodiment of this application.

For example, FIG. 6 is a schematic diagram of an association relationship between DMRS ports and PTRS ports according to an embodiment of this application. In FIG. 6, a DMRS port group is associated with two PTRS ports whose port numbers are #1 and #2; and the DMRS port group includes two DMRS ports whose port numbers are #1 and #2. In this case, a DMRS port with the port number #1 in the DMRS port group may be associated with a PTRS port with the port number #1, and a DMRS port with the port number #2 in the DMRS port group may be associated with a PTRS port with the port number #2.

If one DMRS port group is associated with one PTRS port, the PTRS port is mapped to a DMRS port with a smallest or largest port number in the DMRS port group.

Figure 7:
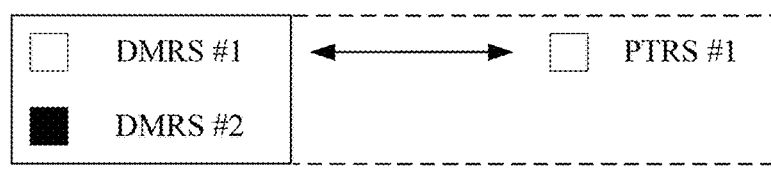
FIG. 7 is a schematic diagram of an association relationship between a DMRS port and a PTRS port according to an embodiment of this application.
Figure 8:
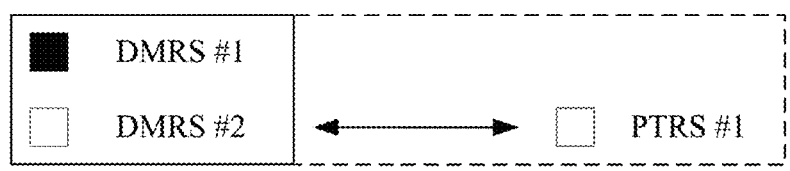
FIG. 8 is a schematic diagram of an association relationship between a DMRS port and a PTRS port according to an embodiment of this application.

For example, FIG. 7 is a schematic diagram of an association relationship between a DMRS port and a PTRS port according to an embodiment of this application. In FIG. 7, a DMRS port group is associated with one PTRS port whose port number is #1; and the DMRS port group includes two DMRS ports whose port numbers are #1 and #2. In this case, a DMRS port with the port number #1 in the DMRS port group may be associated with the PTRS port. Certainly, a DMRS port with the port number #2 in the DMRS port group may be alternatively associated with the PTRS port. For details, refer to FIG. 8.

If one DMRS port group is associated with one PTRS port, the PTRS port is mapped to a DMRS port with a largest signal-to-noise ratio (SNR) in the DMRS port group.

Certainly, the foregoing descriptions are merely examples. The association rule may be alternatively in another form, for example, directly configured by higher layer signaling or by using RRC signaling. For example, the RRC signaling may be used to configure an association relationship between one PTRS port and a DMRS port in one DMRS port group.

When the network device sends the association relationship between the DMRS port and the PTRS port or a threshold (an MCS threshold or a scheduled bandwidth threshold) to the terminal, the association relationship between the DMRS port and the PTRS port or the threshold may be indicated in any of the following manners.

(1) Explicit indication: The association relationship between the DMRS port and the PTRS port is explicitly notified to the terminal by using higher layer signaling, radio resource control (RRC) signaling, or downlink control information (DCI) signaling, or through broadcasting, or the association relationship is predefined. The explicit notification may be based on the terminal, or may be based on a cell. Indication content may be specific PTRS presence/pattern/port information, or may be an adjustment value (predefined or previous) according to an agreed method.

It should be noted that when the network device explicitly indicates the association relationship between the DMRS port and the PTRS port, the indicated association relationship between the DMRS port and the PTRS port may be determined based on the association rule, or may be determined by the network device in another manner. In this manner, the PTRS port can be mapped to a layer with a higher signal to interference plus noise ratio (SINR), to achieve better tracking performance.

(2) Implicit indication: The association rule may be notified to the terminal by using higher layer signaling, RRC signaling, or DCI signaling, or through broadcasting, or the association rule may be predefined. The association rule may be based on the terminal, or may be based on a cell. Indication content may be the association rule or the threshold, or may be an adjustment value according to an agreed method.

(3) Explicit indication in combination with implicit indication: On the basis that the association rule or the threshold is indicated by using higher layer signaling, RRC signaling, or DCI signaling, or through broadcasting, or the association rule or the threshold is predefined, the network side and the terminal determine PTRS presence/pattern/port information based on an implicit association rule by using an MCS, a bandwidth, a subcarrier spacing, a mapping relationship between the MCS and a transport block size sequence number, a mapping relationship between the MCS and a modulation order, a capability of the terminal, a quantity of layers to be scheduled, a quantity of code words, and the like. In addition, the PTRS presence/pattern/port information is explicitly or implicitly configured by using higher layer signaling, RRC signaling, or DCI signaling. Configured content may be an adjustment value of the PTRS presence/pattern/port information.

Embodiments of this application further provide a communications apparatus. The apparatus may perform the foregoing method embodiments.

Figure 9:
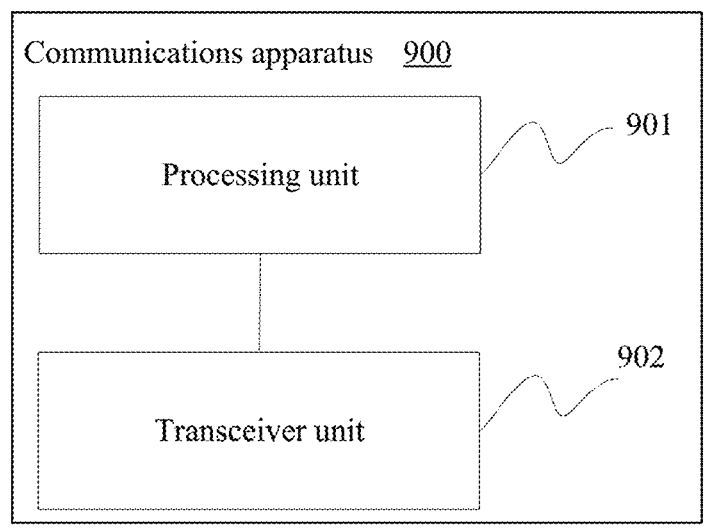
FIG. 9 is a schematic structural diagram of a communications apparatus according to an embodiment of this application.

FIG. 9 is a schematic structural diagram of a communications apparatus 900 according to an embodiment of this application. The apparatus 900 may be a terminal or another device.

Referring to FIG. 9, the apparatus 900 includes:

a processing unit 901, configured to determine a phase tracking reference signal (PTRS) pattern based on at least one of a modulation and coding scheme (MCS) and a scheduled bandwidth, where the PTRS pattern includes one or more PTRS chunks, and each PTRS chunk includes one or more PTRS samples; and a transceiver unit 902, configured to map a PTRS to one or more symbols, and send the one or more symbols to a second device.

Alternatively, the apparatus 900 includes:

a processing unit 901, configured to determine the phase tracking reference signal (PTRS) pattern based on at least one of the following parameters:

an inter-symbol PTRS time domain density, an intra-symbol PTRS chunk density, a quantity of PTRS samples, a quantity of PTRS samples included in a PTRS chunk, and a distribution location of a PTRS chunk within a symbol; and a transceiver unit 902, configured to map a PTRS to one or more symbols, and send the one or more symbols to a second device.

Optionally, the transceiver unit 902 is further configured to receive, from the second device, the information used to indicate the intra-symbol PTRS chunk density and the quantity of PTRS samples.

Optionally, the processing unit 901 is further configured to determine the inter-symbol PTRS time domain density based on information about a mapping relationship between the modulation and coding scheme (MCS) and the inter-symbol PTRS time domain density.

Optionally, the processing unit 901 is further configured to:

determine, from a first association rule, a PTRS chunk density and a quantity of PTRS samples included in a PTRS chunk that are associated with the at least one of the MCS and the scheduled bandwidth, and determine the PTRS chunk density and the quantity of PTRS samples included in a PTRS chunk that are associated with the at least one of the MCS and the scheduled bandwidth, as a PTRS chunk density and a quantity of PTRS samples included in a PTRS chunk that are of the PTRS pattern, where the first association rule is an association relationship between the at least one of the MCS and the scheduled bandwidth and the PTRS chunk density and the quantity of PTRS samples included in a PTRS chunk.

Optionally, the processing unit 901 is further configured to:

determine a threshold of the MCS and/or a threshold of the scheduled bandwidth based on at least one of a phase noise level, a subcarrier spacing, and a frequency.

Optionally, the transceiver unit 902 is further configured to feed back the at least one of the phase noise level, the subcarrier spacing, and the frequency to the second device.

For other content that can be performed by the communications apparatus 900, refer to the foregoing descriptions. Details are not described herein again.

Figure 10:
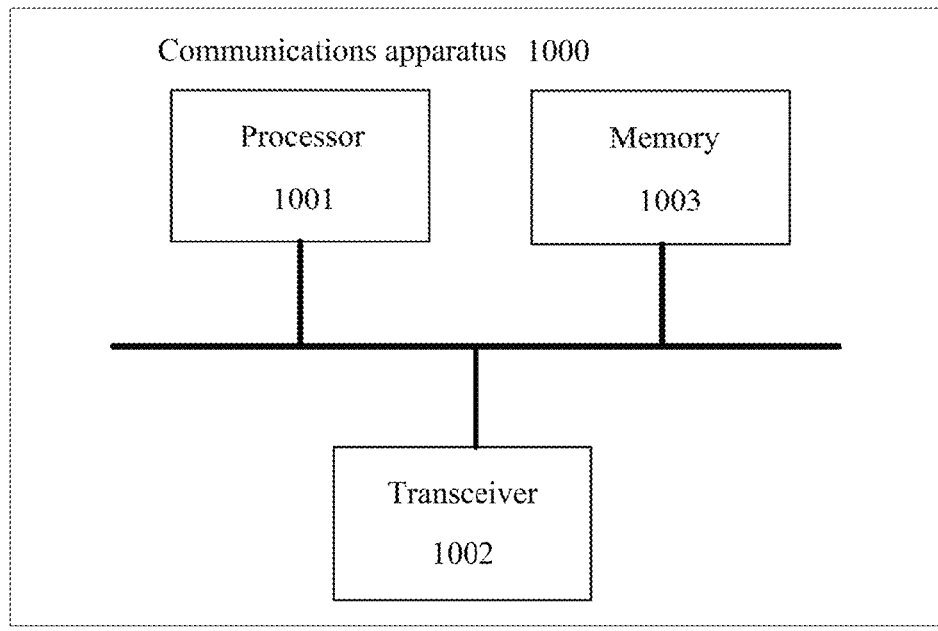
FIG. 10 is a schematic structural diagram of a communications apparatus according to an embodiment of this application.

It should be understood that the foregoing division of units is merely logical function division. In actual implementation, some or all of the units may be integrated into one physical entity, or may be physically separated. In this embodiment of this application, the transceiver unit 902 may be implemented by a transceiver, and the processing unit 901 may be implemented by a processor. As shown in FIG. 10, a communications apparatus 1000 may include a processor 1001, a transceiver 1002, and a memory 1003. The memory 1003 may be configured to store a program/code preinstalled at delivery of the communications apparatus 1000, or may be configured to store code to be executed by the processor 1001, or the like.

An embodiment of this application further provides a communications apparatus. The apparatus may perform the foregoing method embodiments.

Figure 18:
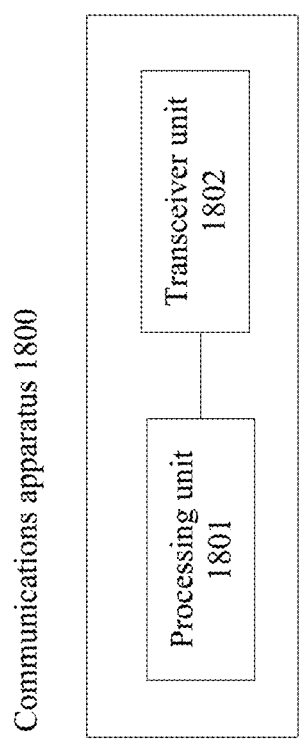
FIG. 18 is a schematic structural diagram of a communications apparatus according to an embodiment of this application.

FIG. 18 is a schematic structural diagram of a communications apparatus 1800 according to an embodiment of this application. The apparatus 1800 may be a network device.

Referring to FIG. 18, the apparatus 1800 includes:

a transceiver unit 1802, configured to receive one or more symbols, where a phase tracking reference signal (PTRS) is mapped to the one or more symbols, a PTRS pattern includes one or more PTRS chunks, and each PTRS chunk includes one or more PTRS samples; and a processing unit 1801, configured to determine the phase tracking reference signal (PTRS) pattern from the one or more symbols.

Optionally, the processing unit 1801 is configured to determine the phase tracking reference signal (PTRS) pattern based on at least one of a modulation and coding scheme (MCS) and a scheduled bandwidth.

Optionally, the processing unit 1801 is configured to determine the phase tracking reference signal (PTRS) pattern based on at least one of the following parameters:

an inter-symbol PTRS time domain density, an intra-symbol PTRS chunk density, and a quantity of PTRS samples.

Optionally, the transceiver unit 1802 is further configured to send the intra-symbol PTRS chunk density and the quantity of PTRS samples.

For other content that can be performed by the communications apparatus 1800, refer to the foregoing descriptions. Details are not described herein again.

It should be understood that the foregoing division of units is merely logical function division. In actual implementation, some or all of the units may be integrated into one physical entity, or may be physically separated. In this embodiment of this application, the transceiver unit 1802 may be implemented by a transceiver, and the processing unit 1801 may be implemented by a processor. As shown in FIG. 10, the communications apparatus 1000 may include the processor 1001, the transceiver 1002, and the memory 1003. The memory 1003 may be configured to store a program/code preinstalled at delivery of the communications apparatus 1000, or may be configured to store code to be executed by the processor 1001, or the like.

An embodiment of this application further provides a communications apparatus. The apparatus may perform the foregoing method embodiments.

Figure 11:
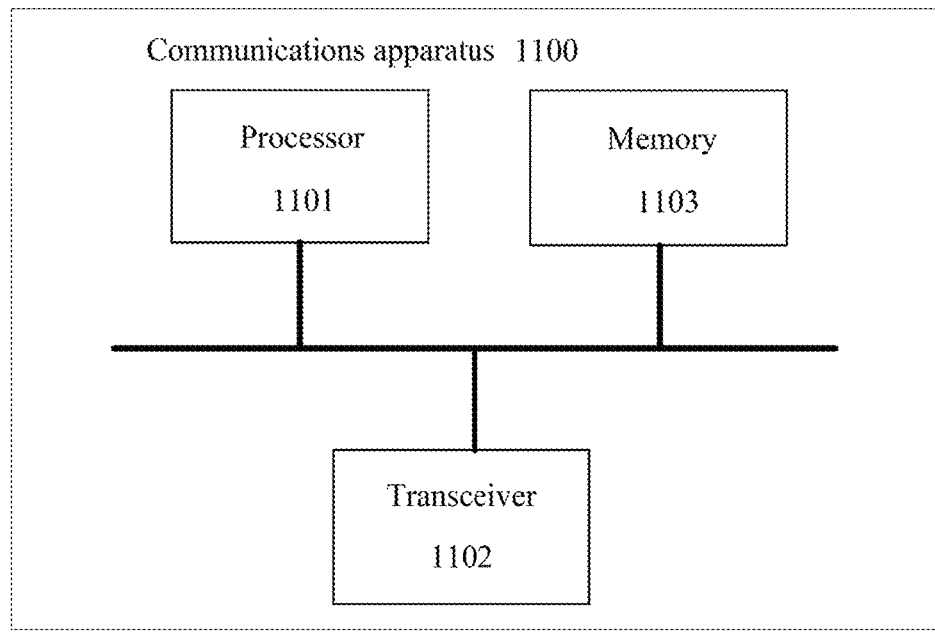
FIG. 11 is a schematic structural diagram of a communications apparatus according to an embodiment of this application.

FIG. 11 is a schematic structural diagram of a communications apparatus 1100 according to an embodiment of this application.

Referring to FIG. 11, the apparatus 1100 includes a processor 1101, a transceiver 1102, and a memory 1103. The memory 1103 may be configured to store a program/code preinstalled at delivery of the communications apparatus 1100, or may be configured to store code to be executed by the processor 1101, or the like.

The processor 1101 is configured to determine, based on an association rule, an association relationship between P PTRS ports and Q DMRS ports in a DMRS port group associated with the P PTRS ports, where P is greater than or equal to 1 and less than or equal to Q, and Q is a quantity of DMRS ports included in the DMRS port group associated with the P PTRS ports.

The transceiver 1102 is configured to send the association relationship between the P PTRS ports and the Q DMRS ports in the DMRS port group to a terminal.

Optionally, the association rule is any one or more of the following:

if one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . . ;

if one DMRS port group is associated with one PTRS port, the PTRS port is mapped to a DMRS port with a smallest or largest port number in the DMRS port group; or if one DMRS port group is associated with one PTRS port, the PTRS port is mapped to a DMRS port with a largest signal-to-noise ratio in the DMRS port group.

Optionally, the association relationship between the PTRS ports and the Q DMRS ports in the DMRS port group means that a DMRS port in the DMRS port group and the PTRS port have a same precoding matrix.

Optionally, the transceiver 1102 is further configured to:

obtain PTRS port configuration reference information, where the PTRS port configuration reference information includes at least one of the following: shared local oscillator information of the terminal, or a common phase error measured on each PTRS port when the terminal is in full configuration of PTRS ports; a quantity of DMRS port groups; a quantity of layers to be scheduled to the terminal; and a maximum quantity of PTRS ports.

The processor 1101 is further configured to determine, based on the PTRS port configuration reference information, a quantity of PTRS ports used by the terminal to send a PTRS.

Optionally, the processor 1101 is further configured to:

if it is determined, based on the shared local oscillator information of the terminal, that a plurality of intermediate radio frequency links of the terminal do not share one crystal oscillator unit, and it is determined that the quantity of layers to be scheduled to the terminal is less than or equal to the maximum quantity of PTRS ports, determine the quantity of layers to be scheduled to the terminal, as the quantity of PTRS ports;

if it is determined, based on the shared local oscillator information of the terminal, that a plurality of intermediate radio frequency links of the terminal do not share one crystal oscillator unit, and it is determined that the quantity of layers to be scheduled to the terminal is greater than the maximum quantity of PTRS ports, determine the maximum quantity of PTRS ports as the quantity of PTRS ports; or if it is determined, based on the shared local oscillator information of the terminal, that a plurality of intermediate radio frequency links of the terminal share one crystal oscillator unit, determine that the quantity of PTRS ports is greater than or equal to 1 and less than or equal to the quantity of DMRS port groups.

An embodiment of this application further provides a communications apparatus. The apparatus may perform the foregoing method embodiments.

Figure 12:
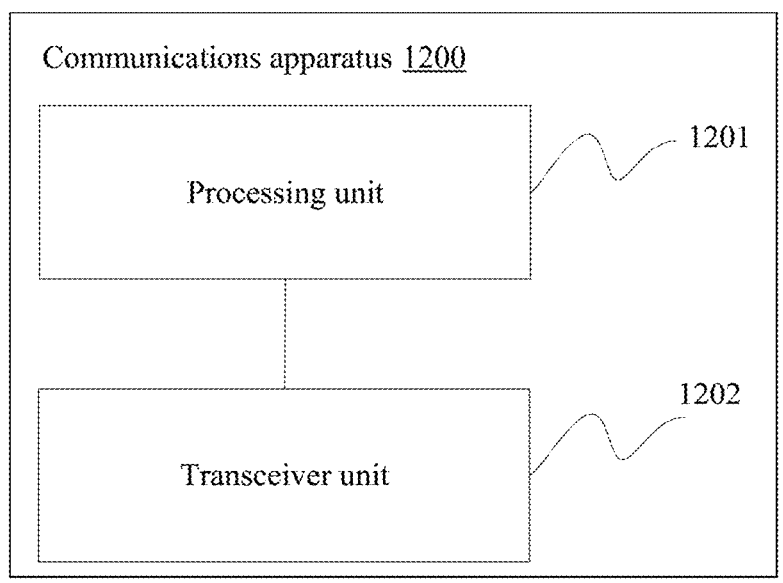
FIG. 12 is a schematic structural diagram of a communications apparatus according to an embodiment of this application.

FIG. 12 is a schematic structural diagram of a communications apparatus 1200 according to an embodiment of this application.

Referring to FIG. 12, the apparatus 1200 includes:

a processing unit 1201, configured to determine, based on an association rule, an association relationship between P PTRS ports and Q DMRS ports in a DMRS port group associated with the P PTRS ports, where P is greater than or equal to 1 and less than or equal to Q, and Q is a quantity of DMRS ports included in the DMRS port group associated with the P PTRS ports; and a transceiver unit 1202, configured to send the association relationship between the P PTRS ports and the Q DMRS ports in the DMRS port group to a terminal.

Optionally, the association rule is any one or more of the following:

if one DMRS port group is associated with a plurality of PTRS ports, the $i^{th}$ PTRS port in the plurality of PTRS ports associated with the DMRS port group is mapped to the $i^{th}$ DMRS port in the DMRS port group based on a sequence of port numbers, where i=1, 2, 3 . . . ;

if one DMRS port group is associated with one PTRS port, the PTRS port is mapped to a DMRS port with a smallest or largest port number in the DMRS port group; or if one DMRS port group is associated with one PTRS port, the PTRS port is mapped to a DMRS port with a largest signal-to-noise ratio in the DMRS port group.

Optionally, the association relationship between the PTRS ports and the Q DMRS ports in the DMRS port group means that a DMRS port in the DMRS port group and the PTRS port have a same precoding matrix.

Optionally, the transceiver unit 1202 is further configured to:

obtain PTRS port configuration reference information, where the PTRS port configuration reference information includes at least one of the following: shared local oscillator information of the terminal, or a common phase error measured on each PTRS port when the terminal is in full configuration of PTRS ports; a quantity of DMRS port groups; a quantity of layers to be scheduled to the terminal; and a maximum quantity of PTRS ports.

The processing unit 1201 is further configured to determine, based on the PTRS port configuration reference information, a quantity of PTRS ports used by the terminal to send a PTRS.

Optionally, the processing unit 1201 is further configured to:

if it is determined, based on the shared local oscillator information of the terminal, that a plurality of intermediate radio frequency links of the terminal do not share one crystal oscillator unit, and it is determined that the quantity of layers to be scheduled to the terminal is less than or equal to the maximum quantity of PTRS ports, determine the quantity of layers to be scheduled to the terminal, as the quantity of PTRS ports;

if it is determined, based on the shared local oscillator information of the terminal, that a plurality of intermediate radio frequency links of the terminal do not share one crystal oscillator unit, and it is determined that the quantity of layers to be scheduled to the terminal is greater than the maximum quantity of PTRS ports, determine the maximum quantity of PTRS ports as the quantity of PTRS ports; or if it is determined, based on the shared local oscillator information of the terminal, that a plurality of intermediate radio frequency links of the terminal share one crystal oscillator unit, determine that the quantity of PTRS ports is greater than or equal to 1 and less than or equal to the quantity of DMRS port groups.

An embodiment of this application further provides a computer-readable storage medium, configured to store a computer software instruction that needs to be executed by the foregoing processor. The computer software instruction includes a program that needs to be executed by the foregoing processor.

Embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a magnetic disk memory and an optical memory) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams, and a combination of a procedure and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specified function in one or more procedures in the flowcharts and/or in one or more blocks in the block diagrams.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may be alternatively loaded onto a computer or another programmable data processing device, so that a series of operations and steps are performed on the computer or the other programmable device to generate computer-implemented processing. Therefore, the instructions executed on the computer or the other programmable device provide steps for implementing a specified function in one or more procedures in the flowcharts and/or in one or more blocks in the block diagrams.

A person skilled in the art may make various modifications and variations to this application without departing from the spirit and scope of this application. This application is intended to cover these modifications and variations provided that these modifications and variations of this application fall within the scope defined by the claims of this application and equivalent technologies thereof.

The invention claimed is:

1. A communication method, comprising:
mapping a phase tracking reference signal (PTRS) pattern to one or more symbols, wherein the PTRS pattern comprises multiple non-consecutive PTRS chunks in time domain, wherein each PTRS chunk of the multiple non-consecutive PTRS chunks comprises multiple consecutive PTRS samples in time domain, and wherein the multiple non-consecutive PTRS chunks of the PTRS pattern are in one symbol; and
sending the one or more symbols;
wherein a quantity of PTRS chunks in one symbol and a quantity of PTRS samples in one PTRS chunk are determined based on a scheduled bandwidth.

2. The method according to claim 1, wherein the quantity of PTRS chunks in one symbol is 2 or 4; and
wherein the quantity of PTRS samples in one PTRS chunk is 2 or 4.

3. The method according claim 1, wherein the quantity of PTRS chunks in one symbol is determined based on a correspondence between the scheduled bandwidth and the quantity of PTRS chunks; and
wherein the quantity of PTRS samples in one PTRS chunk is determined based on a correspondence between the scheduled bandwidth and the quantity of PTRS samples.

4. The method according to claim 1, wherein the PTRS pattern is determined based on a distribution of PTRS chunks within a symbol, the quantity of PTRS chunks and the quantity of PTRS samples; and
wherein the distribution of PTRS chunks within the symbol is determined based on the quantity of PTRS chunks and the quantity of PTRS samples.

5. The method according to claim 4, wherein the quantity of PTRS chunks is 2, and two PTRS chunks are distributed at two ends of the symbol.

6. The method according to claim 1, further comprising:
receiving information for determining the quantity of PTRS chunks and the quantity of PTRS samples.

7. The method according to claim 1, wherein the one or more symbols are one or more discrete fourier transform spread orthogonal frequency division multiplexing (DFT-s-OFDM) symbols.

8. The method according to claim 1, wherein mapping the PTRS pattern to the one or more symbols is based on the scheduled bandwidth not being lower than a threshold of scheduled bandwidth.

9. The method according to claim 8, further comprising:
determining the threshold of scheduled bandwidth based on at least one of a phase noise level, a subcarrier spacing, or a frequency.

10. A communication method, comprising:
receiving one or more symbols, wherein a phase tracking reference signal (PTRS) pattern is mapped to the one or more symbols, wherein the PTRS pattern comprises multiple non-consecutive PTRS chunks in time domain, wherein each PTRS chunk of the multiple non-consecutive PTRS chunks comprises multiple consecutive PTRS samples in time domain, and wherein the multiple non-consecutive PTRS chunks of the PTRS pattern are in one symbol; and
determining the PTRS pattern from the one or more symbols;
wherein a quantity of PTRS chunks in one symbol and a quantity of PTRS samples in one PTRS chunk are determined based on a scheduled bandwidth.

11. The method according to claim 10, wherein the quantity of PTRS chunks in one symbol is 2 or 4; and
wherein the quantity of PTRS samples in one PTRS chunk is 2 or 4.

12. The method according to claim 10, wherein the quantity of PTRS chunks in one symbol is determined based on a correspondence between the scheduled bandwidth and the quantity of PTRS chunks;
wherein the quantity of PTRS samples in one PTRS chunk is determined based on a correspondence between the scheduled bandwidth and the quantity of PTRS samples.

13. The method according to claim 10, wherein the PTRS pattern is determined based on a distribution of PTRS chunks within a symbol, the quantity of PTRS chunks and the quantity of PTRS samples;
wherein the distribution of PTRS chunks within the symbol is determined based on the quantity of PTRS chunks and the quantity of PTRS samples.

14. The method according to claim 13, wherein the quantity of PTRS chunks is 2, and wherein two PTRS chunks are distributed at two ends of the symbol.

15. A communication apparatus, comprising:
a processor configured to map a phase tracking reference signal (PTRS) pattern to one or more symbols, wherein the PTRS pattern comprises multiple non-consecutive PTRS chunks in time domain, wherein each PTRS chunk of the multiple non-consecutive PTRS chunks comprises multiple consecutive PTRS samples in time domain, and wherein the multiple non-consecutive PTRS chunks of the PTRS pattern are in one symbol; and
a transceiver configured to send the one or more symbols;
wherein a quantity of PTRS chunks in one symbol and a quantity of PTRS samples in one PTRS chunk are determined based on a scheduled bandwidth.

16. The communication apparatus according to claim 15, wherein the quantity of PTRS chunks in one symbol is 2 or 4; and
wherein the quantity of PTRS samples in one PTRS chunk is 2 or 4.

17. The communication apparatus according claim 15, wherein the quantity of PTRS chunks in one symbol is determined based on a correspondence between the scheduled bandwidth and the quantity of PTRS chunks;
wherein the quantity of PTRS samples in one PTRS chunk is determined based on a correspondence between the scheduled bandwidth and the quantity of PTRS samples.

18. The communication apparatus according to claim 15, wherein the PTRS pattern is determined based on a distribution of PTRS chunks within a symbol, the quantity of PTRS chunks and the quantity of PTRS samples;
wherein the distribution of PTRS chunks within the symbol is determined based on the quantity of PTRS chunks and the quantity of PTRS samples.

19. The communication apparatus according to claim 18, wherein the quantity of PTRS chunks is 2, and wherein two PTRS chunks are distributed at two ends of the symbol.

20. The communication apparatus according to claim 15, wherein the transceiver is further configured to receive information for determining the quantity of PTRS chunks and the quantity of PTRS samples.

21. The communication apparatus according to claim 15, wherein the one or more symbols are one or more discrete fourier transform spread orthogonal frequency division multiplexing (DFT-s-OFDM) symbols.

22. The communication apparatus according to claim 15, wherein the processor is further configured to not map a respective PTRS pattern based on a respective scheduled bandwidth being lower than a threshold of scheduled bandwidth.

23. The communication apparatus according to claim 22, wherein the processor is further configured to determine the threshold of scheduled bandwidth based on at least one of a phase noise level, a subcarrier spacing, or a frequency.

24. A communication apparatus, comprising:
a transceiver configured to receive one or more symbols, wherein a phase tracking reference signal (PTRS) pattern is mapped to the one or more symbols, wherein the PTRS pattern comprises multiple non-consecutive PTRS chunks in time domain, wherein each PTRS chunk of the multiple non-consecutive PTRS chunks comprises multiple consecutive PTRS samples in time domain, and wherein the multiple non-consecutive PTRS chunks of the PTRS pattern are in one symbol; and
a processor configured to determine the PTRS pattern from the one or more symbols;
wherein a quantity of PTRS chunks in one symbol and a quantity of PTRS samples in one PTRS chunk are determined based on a scheduled bandwidth.

25. The communication apparatus according to claim 24, wherein the quantity of PTRS chunks in one symbol is 2 or 4; and
wherein the quantity of PTRS samples in one PTRS chunk is 2 or 4.

26. The communication apparatus according to claim 24, wherein the quantity of PTRS chunks in one symbol is determined based on a correspondence between the scheduled bandwidth and the quantity of PTRS chunks;
wherein the quantity of PTRS samples in one PTRS chunk is determined based on a correspondence between the scheduled bandwidth and the quantity of PTRS samples.

27. The communication apparatus according to claim 24, wherein the PTRS pattern is determined based on a distribution of PTRS chunks within a symbol, the quantity of PTRS chunks and the quantity of PTRS samples;
wherein the distribution of PTRS chunks within the symbol is determined based on the quantity of PTRS chunks and the quantity of PTRS samples.

28. The communication apparatus according to claim 27, wherein the quantity of PTRS chunks is 2, and wherein two PTRS chunks are distributed at two ends of the symbol.

* * * * *